(12) United States Patent
Lin et al.

(10) Patent No.: US 9,014,111 B2
(45) Date of Patent: Apr. 21, 2015

(54) MULTI-BLOCK RADIO ACCESS METHOD AND TRANSMITTER MODULE AND RECEIVER MODULE USING THE SAME

(75) Inventors: Tzu-Ming Lin, Hsinchu County (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 247 days.

(21) Appl. No.: 13/562,332

(22) Filed: Jul. 31, 2012

(65) Prior Publication Data

US 2013/0039293 A1 Feb. 14, 2013

Related U.S. Application Data

(60) Provisional application No. 61/521,770, filed on Aug. 10, 2011.

(51) Int. Cl.
*H04W 4/00* (2009.01)
*H04L 1/00* (2006.01)
*H04L 5/00* (2006.01)

(52) U.S. Cl.
CPC ............ *H04L 1/0038* (2013.01); *H04L 5/0016* (2013.01); *H04L 1/0003* (2013.01); *H04L 1/0009* (2013.01); *H04L 1/0047* (2013.01)

(58) Field of Classification Search
CPC .............................. H04W 28/00; H04W 72/00
USPC ................................................. 370/329, 320
See application file for complete search history.

(56) References Cited

U.S. PATENT DOCUMENTS

| | | |
|---|---|---|
| 5,712,860 A | 1/1998 | Hardin |
| 5,724,515 A | 3/1998 | Barnes et al. |
| 6,556,617 B1 | 4/2003 | Tsujimoto |

(Continued)

FOREIGN PATENT DOCUMENTS

| | | |
|---|---|---|
| CN | 101247171 | 8/2008 |
| CN | 101675696 | 3/2010 |

(Continued)

OTHER PUBLICATIONS

Stefan Kaiser, "OFDM Code Division Multiplexing with Unequal Error Protection and Flexible Data Rate Adaptation", In Proceedings IEEE Global Telecommunications Conference (GLOBECOM 2001), Nov. 2001, pp. 861-865.

(Continued)

*Primary Examiner* — Andrew Lai
*Assistant Examiner* — Sumitra Ganguly
(74) *Attorney, Agent, or Firm* — Jianq Chyun IP Office

(57) ABSTRACT

A multi-blocks radio access method is provided and includes the following steps. A plurality of resource blocks are grouped into a plurality of groups. One resource block is respectively selected from the groups to form a plurality of resource block sets. Data to be accessed are transmitted in corresponding one of the resource block sets. A code division multiplexing code sequence is determined for the corresponding one of the resource block sets according to at least one of a plurality of parameters. Encoding or decoding operations are performed on the data to be accessed according to the corresponding one of the resource block sets and the corresponding code division multiplexing code sequence. The encoded or decoded data is accessed. A transmitter module and a receiver module using the foregoing method are also provided.

38 Claims, 18 Drawing Sheets

(56) References Cited

U.S. PATENT DOCUMENTS

| | | | |
|---|---|---|---|
| 7,489,736 | B2 | 2/2009 | Hottinen |
| 7,729,433 | B2 * | 6/2010 | Jalloul et al. ............... 375/260 |
| 7,876,774 | B2 | 1/2011 | Zangi |
| 8,064,424 | B2 | 11/2011 | Sambhwani et al. |
| 8,477,708 | B2 * | 7/2013 | Higuchi et al. ............. 370/329 |
| 2004/0196780 | A1 | 10/2004 | Chin et al. |
| 2006/0256854 | A1 * | 11/2006 | Jiang ..................... 375/240.03 |
| 2007/0110096 | A1 | 5/2007 | Geile et al. |
| 2011/0110357 | A1 | 5/2011 | Chung et al. |
| 2011/0170504 | A1 | 7/2011 | Xu et al. |

FOREIGN PATENT DOCUMENTS

| | | |
|---|---|---|
| CN | 101743711 | 6/2010 |
| EP | 1865643 | 12/2007 |
| TW | 200708115 | 2/2007 |
| TW | 201112829 | 4/2011 |

OTHER PUBLICATIONS

Arkhipov et al., "Advantages of Superimposed Packets Allocation for OFDM-CDM", Vehicular Technology Conference, 2005. VTC 2005-Spring. 2005 IEEE 61st, May 30, 2005, pp. 3053-3057, vol. 5.

Lee et al, "A New CDMA-Based Bandwidth Request Method for IEEE 802.16 OFDMA/TDD Systems", IEEE Communications Letters, Feb. 2010, pp. 124-126, vol. 14, No. 2.

Son et al., "Multi-user Multi-service Random Access and Channel Assignment for mm Wavelength Uplink Broadband Wireless System", NGMAST 2007, Sep. 12, 2007, pp. 304-309.

Choi et al., "Multichannel Random Access in OFDMA Wireless Network", IEEE Journal on Selected Areas in Communications, Mar. 2006, pp. 603-613, vol. 24, No. 3.

"Office Action of Taiwan Counterpart Application", issued on Jun. 23, 2014, p. 1-p. 4.

"Office Action of China Counterpart Application", issued on Nov. 3, 2014, p. 1-p. 6.

\* cited by examiner

|  |  | Code Rate | QPSK |  |
|---|---|---|---|---|
| Non CDM | 28 bits | 1/10 | 288 bits | 144 QAM |
| CDM (2 users) | 28 bits | 1/5 | 144 bits | 72 QAM |

| Ci \ CIj | 1 | 2 | 3 | 4 |
|---|---|---|---|---|
| 1 | 0 | | | |
| 2 | | | | |
| 3 | | | 0 | |
| 4 | | | | 0 |

Ei=3

| Ci \ CIj | 1 | 2 | 3 | 4 |
|---|---|---|---|---|
| 1 | | 0 | | |
| 2 | | | 0 | |
| 3 | | | | 0 |
| 4 | 0 | | | |

Ei=13

| Ci \ CIj | 1 | 2 | 3 | 4 |
|---|---|---|---|---|
| 1 | | | | 0 |
| 2 | | | | |
| 3 | | 0 | | |
| 4 | | | 0 | |

Ei=27

| Ci \ CIj | 1 | 2 | 3 | 4 |
|---|---|---|---|---|
| 1 | | 0 | | |
| 2 | | | | 0 |
| 3 | | | | |
| 4 | 0 | | | |

FIG. 11

MULTI-BLOCK RADIO ACCESS METHOD AND TRANSMITTER MODULE AND RECEIVER MODULE USING THE SAME

CROSS-REFERENCE TO RELATED APPLICATION

This application claims the priority benefits of U.S. provisional application Ser. No. 61/521,770, filed on Aug. 10, 2011. The entirety of the above-mentioned patent application is hereby incorporated by reference herein and made a part of this specification.

TECHNICAL FIELD

The disclosure relates to a signal transmission method of radio communication and a transmitter module and a receiver module using the same. Particularly, the disclosure relates to a multi-block radio access method and a transmitter module and a receiver module using the same.

BACKGROUND

Current radio access systems are generally divided into two types, and one type is based on a centralized control technique, for example, a long term evolution (LTE) technique and an IEEE 802.16 technique. According to such technique, a certain host in a network is taken as a command center for managing the whole network, and other hosts have to first obtain permission from the commander before transmitting data. Another type is based on a distributed control technique, for example, an IEEE 802.11 technique. According to such technique, one host in the network has to contend for access right before executing data transmission, and the other hosts have to wait for a next chance to contend for transmitting data.

FIG. 1 is a data transmission schematic diagram of the above two radio access systems. In the radio access system of the IEEE 802.11 technique, when a transmission medium is applicable, different mobile devices are in contention for an applicable resource to transmit data. The mobile device acquiring the resource may directly transit a single block with a different data length. In the radio access systems of the LTE and IEEE 802.16 technique, a data transmission process could be divided into two phases. In a first stage, the mobile device first transmits preambles to contend a resource grant before transmitting data packets. If the contention is successful, a base station transmits the resource grant to indicate the resource allocated to the mobile device, so as to facilitate transmitting the data packets in a second stage. In other words, the mobile device first confirms that the resource is applicable before transmitting the data packets. Therefore, the mobile device of the LTE and IEEE 802.16 technique may have to spend time to acquire the permission of the resource grant.

In specifications of 3GPP LTE TS 22.368, regarding small or sliced data transmission, a plurality of solutions are prepared to avoid overhead and signal latency. A current consensus is that the system should support transmission of the small amount of data under a minimal network impact. These solutions are also prepared to avoid signalling overhead caused by random access, additional latency caused by scheduling request (SR) of the mobile devices and overprotect of a static resource used for small or sliced data transmission.

Moreover, a transmission capacity of physical downlink control channels (PDCCHs) in the LTE system still has some situations required to be avoided. Taking a system bandwidth of 10 MHz as an example, about 10 PDCCHs are transmitted within one basic transmission time interval (TTI). The PDCCHs are used to schedule dedicated user equipments (UEs) for transmitting data. Since a part of control channel elements (CCE) of the PDCCH is used for certain purposes, for example, system information, random access and transmission power control, etc., in an example of reserving 3 or 2 orthogonal frequency division multiplexing (OFDM) symbols for PDCCH transmission in one basic TTI, regarding the dedicated scheduling, one PDCCH only has about 25 or 10 applicable CCEs. However, one subframe may have 50 resource blocks (RB), and if most of downlink assignments are small assignments, i.e. one resource block corresponds to one physical downlink shared channel (PDSCH), the number of the CCEs probably cannot indicates all of the resource blocks. In this way, a situation in control channel transmission capacity is occurred, which means that the number of the control channels is inadequate to indicate all of the data transmissions. If the indication for transmitting multiple RBs can be shared, such situation is avoided.

SUMMARY

The disclosure provides a multi-block radio access method, which includes following steps. A plurality of resource blocks are grouped into a plurality of block groups. One resource block is respectively selected from the block groups to form a plurality of resource block sets. Data to be accessed are transmitted in corresponding one of the resource block sets. A code division multiplexing code sequence is determined for the corresponding one of the resource block sets according to at least one of a plurality of parameters. Encoding or decoding operations are performed on the data to be accessed according to the corresponding one of the resource block sets and the corresponding code division multiplexing code sequence. The encoded or decoded data is accessed.

The disclosure provides a transmitter module adapted to execute a multi-block radio access method. The transmitter module includes a block set decision unit and an encoding unit. The block set decision unit groups a plurality of resource blocks into a plurality of block groups. The block set decision unit respectively determines one resource block from the block groups to form a plurality of resource block sets. Data to be accessed are transmitted in corresponding one of the resource block sets. The encoding unit determines a code division multiplexing code sequence for the corresponding one of the resource block sets according to at least one of a plurality of parameters. The encoding unit performs an encoding operation on the data to be transmitted according to the corresponding one of the resource block sets and the corresponding code division multiplexing code sequence.

The disclosure provides a receiver module adapted to execute a multi-block radio access method. The receiver module includes a detection unit and a decoding unit. The detection unit detects a resource block set of received data. The received data are transmitted in the resource block sets. The decoding unit determines a code division multiplexing code sequence used for decoding the resource block set of the data according to at least one of a plurality of parameters. The decoding unit decodes the data according to the resource block set and the code division multiplexing code sequence.

The disclosure provides a multi-block radio access method, which includes following steps. A plurality of resource blocks are grouped into a plurality of block groups according to a parameter related to data to be accessed. One resource block is respectively selected from the block groups to form a plurality of resource block sets corresponding to the different transceiver equipments. Data to be accessed are transmitted in corresponding one of the resource block sets. Encoding or decoding operations are performed on the data to be accessed for the different transceiver equipments according to the corresponding one of the resource block sets and the corresponding code sequence. The encoded or decoded data is accessed.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a schematic diagram of a transceiver encoding/decoding a single or multiple blocks of RBs according to an exemplary embodiment of the disclosure.

FIG. 10A, FIG. 10B and FIG. 11 are diagrams illustrating a solution of using CDM codes to avoid mutual interference of inter-cells according to an exemplary embodiment of the disclosure.

DETAILED DESCRIPTION

Figure 1:
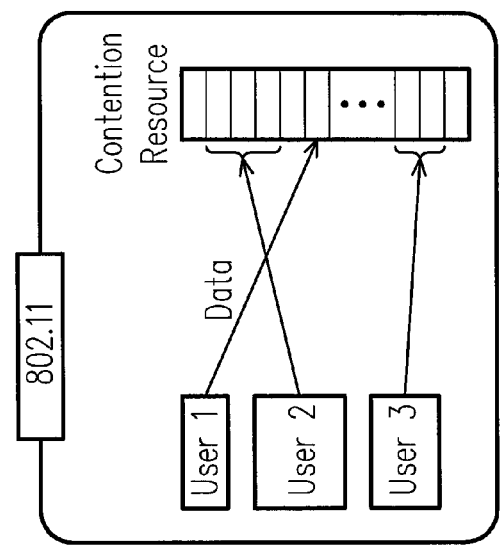
FIG. 1 is a data transmission schematic diagram of two radio access systems.
Figure 1:
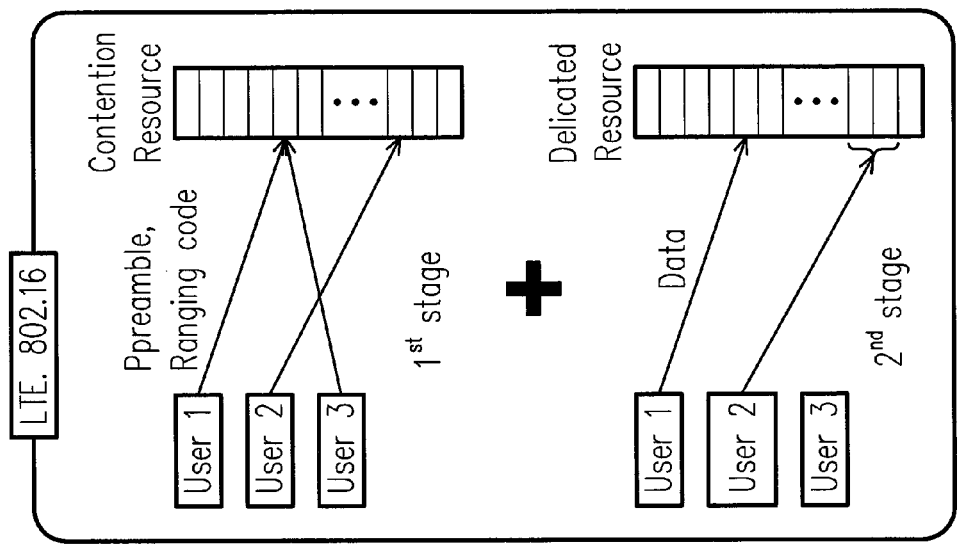

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A machine type communication (MTC) is to connect all of devices in the life through a network to implement automatic communication between the devices, so as to form a machine-to-machine (M2M) network, and provide a more convenient life to the user. However, since the M2M network probably connects a large amount of the devices, and these communication device may cause system overload or even inefficient data transmission due to a large amount of simultaneous contentions of radio access. Therefore, in a current radio communication system, how to improve a user amount of the system for the MTC and provide a high efficiency and low latency transmission for low frequency small data of the M2M network are important issues to be developed.

The disclosure discloses a contention-based multi-block radio access mechanism, which allows a plurality of user equipments (UEs) to use a single resource indication message to implement a plurality of simultaneous contention-based data transmissions. In this way, usage of the resource indication message is saved, and under a same message usage amount, more UEs are indicated to perform the transmission. In this way, the user amount of the system is increased, and the latency caused by waiting the resource indication is shortened. Meanwhile, the disclosure provides a set of contention solution to avoid a collision caused by simultaneous data transmission of multiple UEs.

Figure 2:
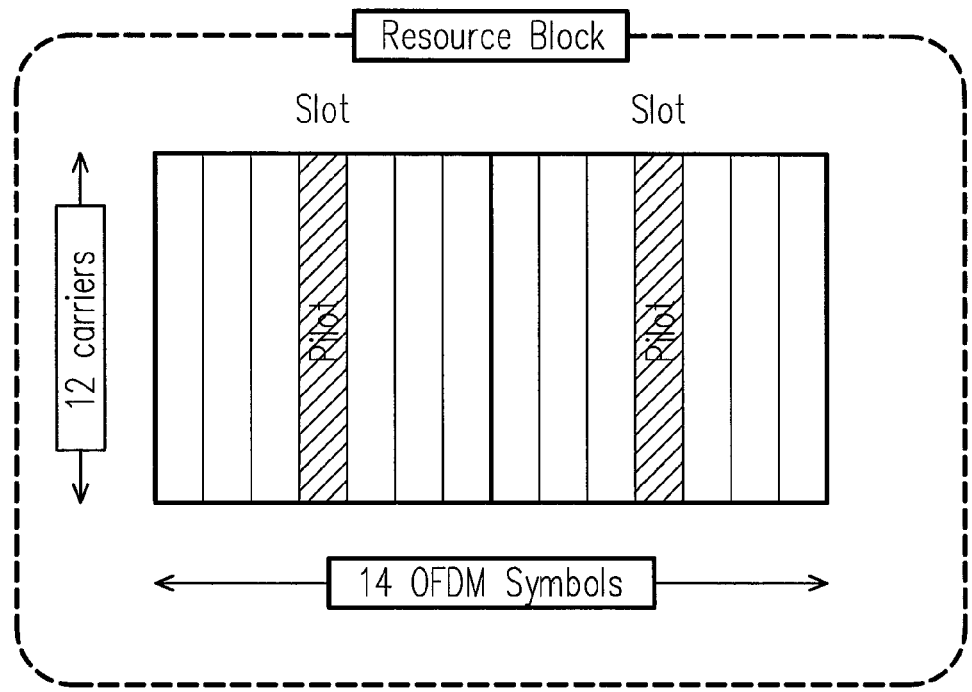
FIG. 2 is a schematic diagram of a signal structure of a resource block (RB).
Figure 2:
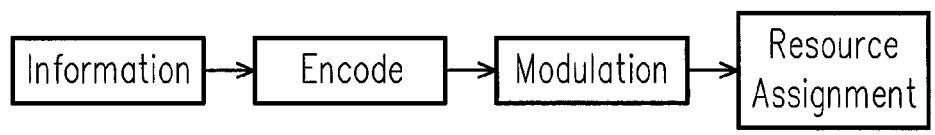

FIG. 2 is a schematic diagram of a signal structure of a resource block (RB). Referring to FIG. 2, regarding a UE, the RBs are basic units used for transmitting uplink signals. Since two orthogonal frequency division multiplexing (OFDM) symbols are preserved as demodulation reference signals (DMRSs), the UE can load total 144 modulation symbols in one RB. For example, when a modulation mechanism is quadrature phase shift keying (QPSK), total 288 coded bits can be accessed in one RB. Considering small or sliced data transmission, a minimal size of the coded bit may probably cause overprotection of the transmission signals, and a result of such overprotection probably causes waste of radio resources. In the disclosure, a signal structure based on a code division multiplexing (CDM) technique is used to avoid the above situation, though the disclosure is not limited thereto. As shown in FIG. 2, when the signal structure based on the CDM technique is used, a minimal size of the modulation symbols loaded in the RB is determined according to the number of the UEs that perform the multiplex transmission on the RBs. For example, compared to a signal structure based on a non-CDM technique, the RB used for multiplex transmission of two UEs increases a code rate thereof by twice.

In a long term evolution (LTE) system, each of the RBs includes two slots, each of the slots is composed of 7 OFDM symbols, and each of the OFDM symbols includes 12 carriers. Since each of the slots allocates one OFDM symbol as a pilot, regarding each of the RBs, the total resource is 12 OFDM symbols. Therefore, each of the RBs has 144 resource elements. Each element can carry 2-bit information when the modulation scheme is QPSK, or can carry 4-bit information when the modulation scheme is 16 QAM, or can carry 6-bit information when the modulation scheme is 64-QAM. When the QPSK is applied, there are total 288 bits information can be allocated in a RB. When a transmitter intends to transmit information of 28 bits via a RB, the code rate is 1/10 after the channel coding and modulated by QPSK. If the same resource size and modulation scheme is applied to the CDM signal structure of two UEs, the coded bit can be 144 bits for each one. In this way, the code rate is changed to 1/5. Regarding conveying of small or sliced data, usage of the 1/10 code rate is over robust, which may cause the situation of overprotection. In this example, the signal structure based on the CDM technique can provide enough robust coding method to protect the data to be conveyed, and one or more the UEs can use a same radio resource. Therefore, one or multiple UEs can simultaneously transmit data and have enough reliability. Therefore, the signal structure based on the CDM code has the code rate of about 1/5, which can ameliorate the system capacity when compared with non-CDM based system.

Figure 3:
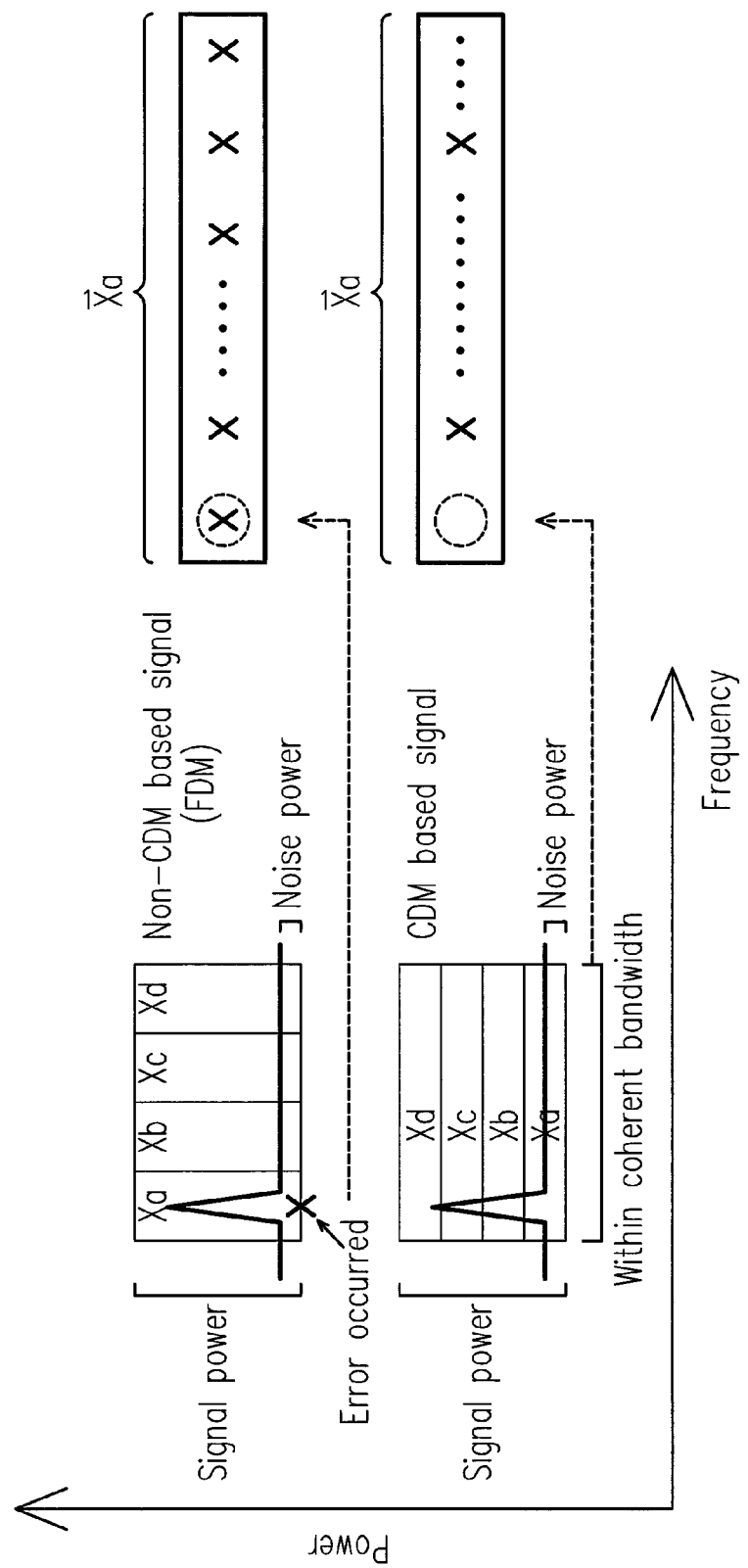
FIG. 3 is a schematic diagram of a signal structure based on a code division multiplexing (CDM) technique.

FIG. 3 is a schematic diagram of a signal structure based on the CDM technique. Referring to FIG. 3, signal vectors Xa, Xb, Xc and Xd are respectively transmitted by different UEs UE#1-UE#4 (not shown). An upper part of the coordinate axis illustrates a non-CDM signal, and a lower part of the coordinate axis illustrates a CDM signal. In this example, the signal vector Xa has an error X in a transmitting process, so that a noise power has a prominent pulse at a place corresponding to the error X, i.e. a narrow-band noise pulse. Compared to the non-CDM signal (for example, a frequency division multiplexing (FDM) technique), the CDM signal can avoid the narrow-band noise pulse, this is because that the transmitted signal is spread in a plurality of carriers, and the influence of the narrow-band noise pulse is averagely distributed. As shown in FIG. 3, the signal vector Xa of the non-CDM signal bears a relatively large noise power. After passing through a channel decoder, a detection performance of the non-CDM signal is relatively poor.

Figure 4:
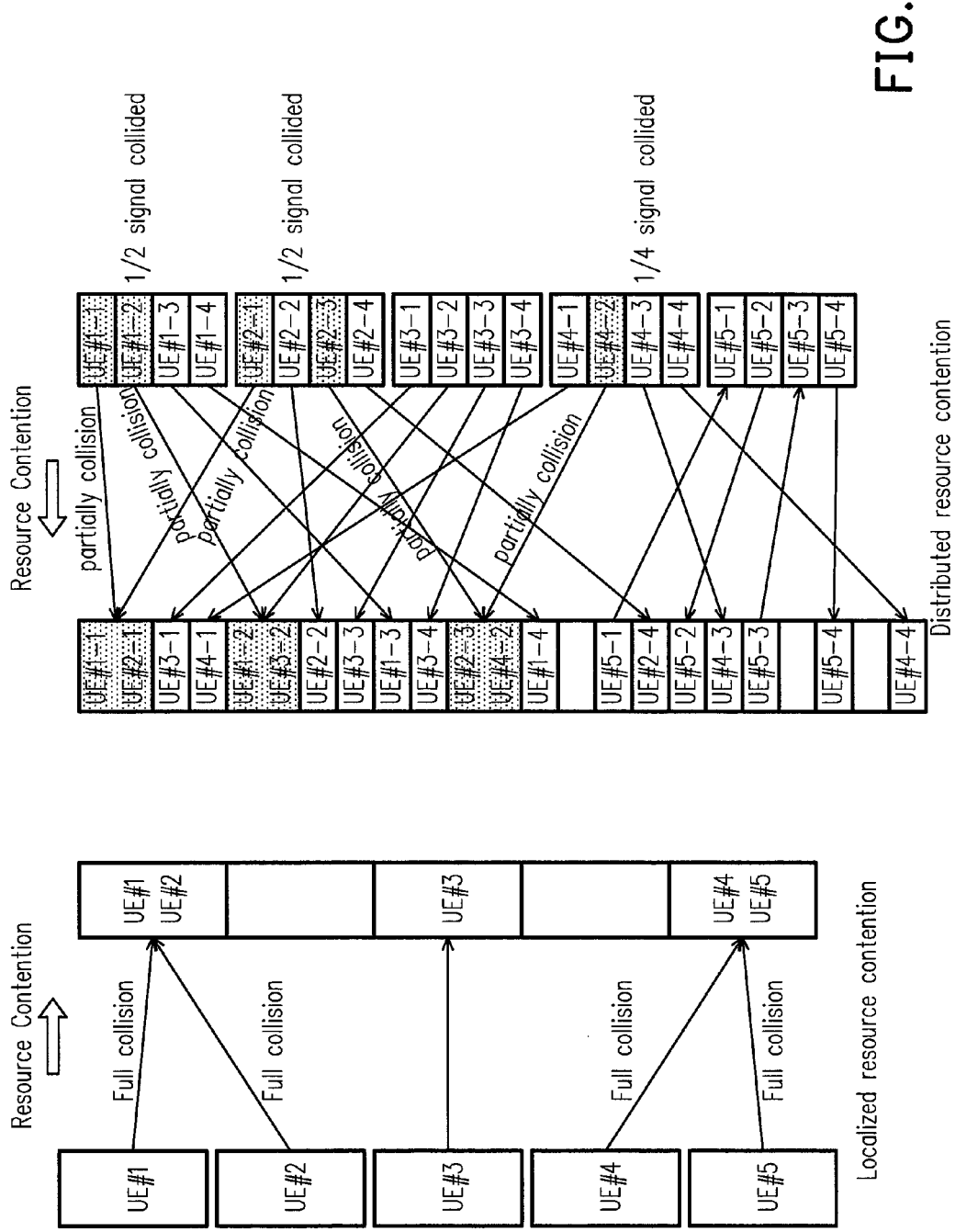
FIG. 4 is a schematic diagram of a contention-based radio access mechanism.

FIG. 4 is a schematic diagram of a contention-based radio access mechanism. Referring to FIG. 4, regarding a contention-based transmission mechanism, one subframe is generally used to transmit the user data, and when two or more UEs use the same resource, collision is probably occurred. Shown as a left part of FIG. 4, in case of a localized resource contention, the UEs UE#1 and UE#2 collide to each other on a first resource part, and UEs UE#4 and UE#5 collide to each other on a last resource part, where one resource part represents more than one resource block. Shown as a right part of FIG. 4, in case of a distributed resource contention, if the data is sliced into multiple blocks, a part of the data blocks may collide, and the other part of the data blocks may not. In the distributed resource contention, if 1/2 of signals (or data) collide to produce an error, such error can be recovered according to an error correction mechanism. In the distributed resource contention, if the data is transmitted through multiple blocks, a coordination mechanism is required between a transmitter (for example, a UE) and a receiver (for example, a base station). If not, the receiver cannot obtain an allocation of the transmitted data and a relationship of the blocks, and cannot recover the multiple data blocks into the original data.

Figure 5:
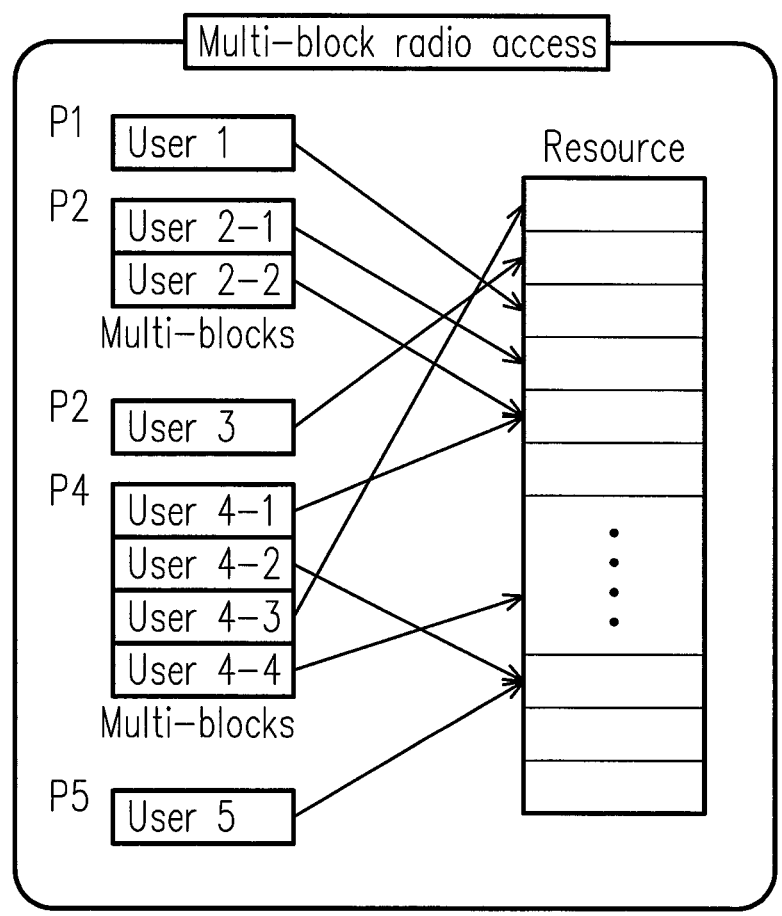
FIG. 5 is a schematic diagram of a multi-block radio access mechanism according to an exemplary embodiment of the disclosure.

FIG. 5 is a schematic diagram of a multi-block radio access mechanism according to an exemplary embodiment of the disclosure. Referring to FIG. 5, the present exemplary embodiment provides a transmission method for contention-based multi-block radio access. In the present exemplary embodiment, the transmitted data is sliced into a plurality of blocks, and the number of blocks to be sliced is determined according to the packet length, and the block groups have transmission contentions. For example, the data transmitted by the UE UE#2 is sliced into two blocks of user 2-1 and user 2-2, which presents a multi-block set. Similarly, the data transmitted by the UE UE#4 is sliced into four blocks of user 4-1 to user 4-4, which also presents a multi-block set. The data blocks transmitted by the UE UE#2 and the UE UE#4 have different packet lengths. Moreover, in this example, the user 2-2 of the UE UE#2 and the user 4-1 of the UE UE#4 are in contention in a same RB, and the user 4-4 of the UE UE#4 and the whole data of the UE UE#5 are in contention in another RB.

In the present exemplary embodiment, if the signal structure is implemented through the CDM technique, regarding small or sliced data transmission and data of different lengths, the transmission method can be more flexible. Moreover, in the direct radio access mechanism, it is unnecessary for two (or multiple) steps radio access, so that signal latency and signalling overhead are mitigated. In addition, in the present exemplary embodiment, it may not be unnecessary to additionally provide the coordination mechanism between the transmitter and the receiver to indicate an allocation of the transmitted data and a relationship of the blocks. In the present exemplary embodiment, since the data is sliced into multiple blocks, and the data blocks are allocated to different carriers, the transmission method of the present exemplary embodiment has channel diversity. Moreover, as described above, the transmission method of the multiple CDM blocks may also enhance transmission reliability.

In an exemplary embodiment of the disclosure, the number of the block groups containing the RBs corresponding to different UEs can be different or the same. Moreover, one RB in the RB set of different UE has the collision, as that shown in FIG. 6. The UE UE#1, UE#2 and UE#3 has collisions at RB entry, which is described as follows.

Figure 6:
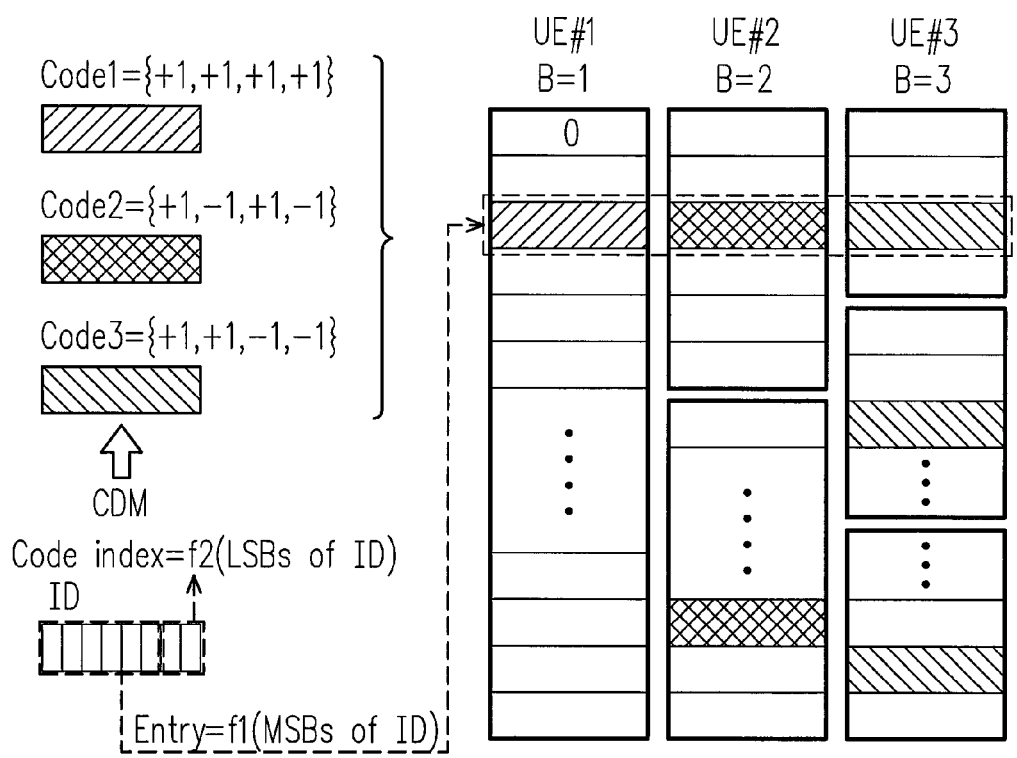
FIG. 6 is a schematic diagram illustrating a method that a user equipment (UE) determines RBs for transmitting one or multiple blocks according to an exemplary embodiment of the disclosure.

FIG. 6 is a schematic diagram illustrating a method that a UE determines RBs for transmitting one or multiple blocks according to an exemplary embodiment of the disclosure. In the exemplary embodiments of the disclosure, different UEs may select different or the same RB group. Referring to FIG. 6, in the present exemplary embodiment, the RBs corresponding to the UEs UE#1, UE#2 and UE#3 are respectively grouped into one block group, two block groups and three block groups, where B represents the number of the grouped block groups. In this example, the UE UE#1 selects a third RB in the RBs thereof as an RB entry. The UEs UE#2 and UE#3 respectively select a third RB in the first block group thereof as the RB entry. Since the UE UE#2 has two block groups, in the second block group, the data to be transmitted is transmitted through another RB. Similarly, the UE UE#3 has three block groups, in the second block group and the third block group, the data to be transmitted is allocated to different RBs for transmission.

The UE of the present exemplary embodiment can use a most significant bit (MSB) of a cell identity (ID) thereof as an input of a function f1 to obtain the RB entry. The function f1 can be a hash function or other functions capable of randomizing the entry selection. Moreover, a least significant bit (LSB) of the cell ID can be used as an input of a function f2 to determine a used CDM code sequence. As shown in FIG. 6, the used CDM code sequences selected by the UEs UE#1, UE#2 and UE#3 are respectively Code 1={+1, +1, +1, +1}, Code 2={+1, −1, +1, −1} and Code 3={+1, +1, −1, −1}. The above CDM code sequences are only used as an example, which are not used to limit the disclosure. Similar to the function f1, the function f2 can also be a hash function or other functions capable of randomizing the entry selection. The methods of determining the RB entry and the CDM code of the present exemplary embodiment are only used an example, which are not used to limit the disclosure. Therefore, in the present exemplary embodiment, even if the UE selects the same block for transmission, the collision is not occurred as different CDM codes are selected.

In the present exemplary embodiment, the total resources used for contention can be determined according to a RB number n, a CDM code number M and a combination of following parameters. The combination of the parameters includes a block group number, a CDM code pattern of the multiple blocks, an identity of the UE (or a cell ID (eNB identifier)) and a retry count. The RBs can represent resources of different frequency, time or code domain. The RBs can be allocated to different frequency, time or other resources. The resources of the RBs can be pre-allocated, which is indicated through control signalling (for example, physical downlink control channel (PDCCH)), or derived through the control signalling (for example, radio network temporary identifier (RNTI)).

FIG. 6 also illustrates rules of determining the CDM-based multiple RBs according to an exemplary embodiment of the disclosure. Referring to FIG. 6, in the present exemplary embodiment, different UEs probably require different number of the block groups according to different transmission instances, and the number of the required bloc groups can be determined according to an information length. In the present exemplary embodiment, the OFDM technique can be used for determination, and the determining block groups may achieve frequency diversity through a distributed manner. Therefore, when the UE determines the contention-based signal, in the present exemplary embodiment, the CDM code and the RBs used for resource allocation are required to be first determined. The CDM code and the RBs used for resource allocation can be determined by using an identity (ID) of the UE. In FIG. 6, MSBs of the ID of the UE may serve as an input of the function f1 to determine the RB entry. Moreover, LSBs of the ID may serve as an input of the function f2 to determine the CDM codes of the RBs. Therefore, in the present exemplary embodiment, the UE determines the RB entry in the RB sets according to the MSBs of the ID thereof. Here, the RB entry is selected from a first block group in one or more block groups, as that shown in FIG. 6. Moreover, the CDM code sequence of each of the RB sets is determined according to the LSBs of the ID of the UE.

Figure 7:
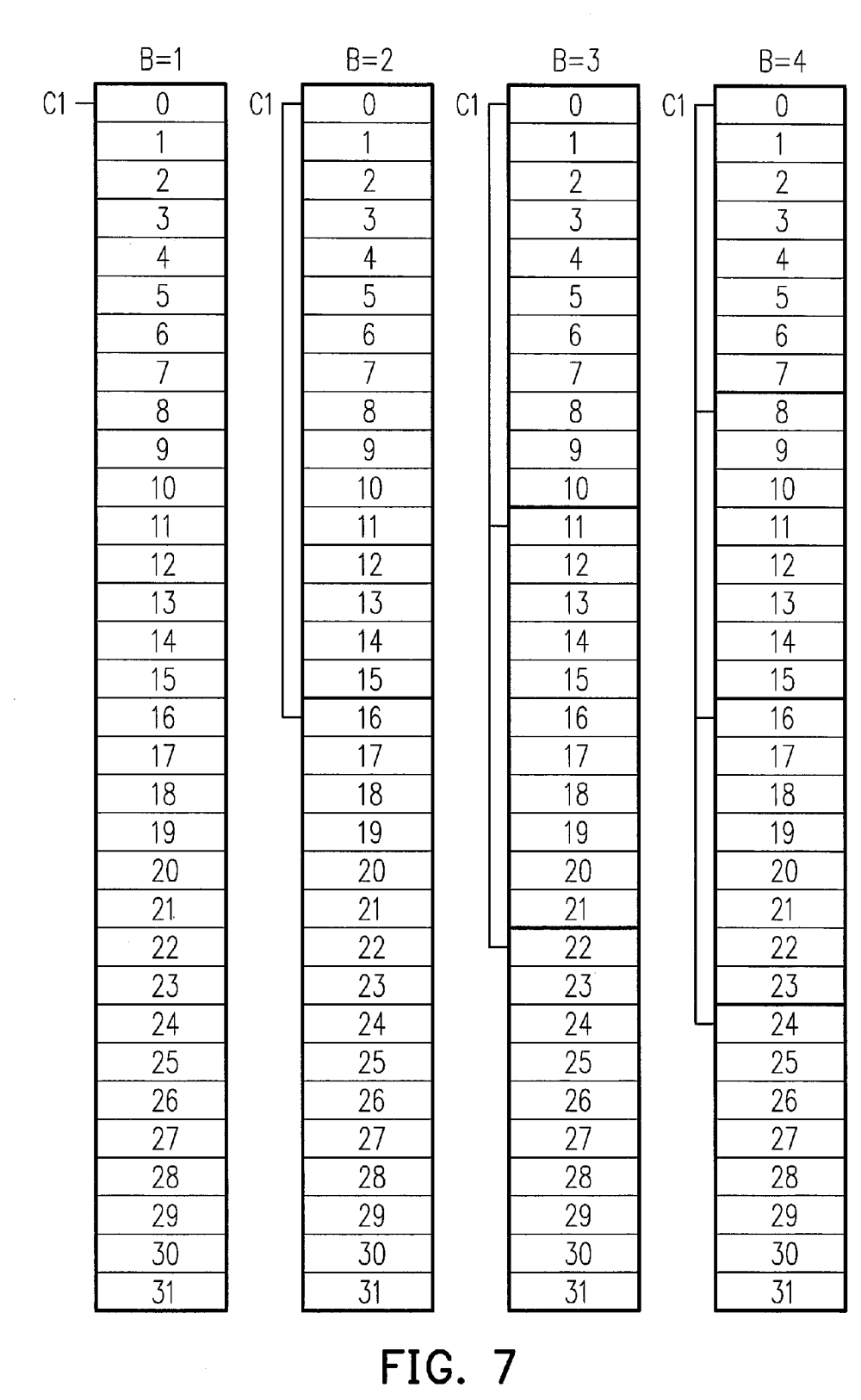

FIG. 7 is a schematic diagram of a transceiver encoding/decoding a single or multiple blocks of the RBs according to an exemplary embodiment of the disclosure. For the transceiver acting as a receiver, since there is none coordination mechanism between the transmitter and the receiver in this embodiment, a data decoding method of the receiver is to blindly take one, two, three or a plurality of block groups for decoding. For example, in FIG. 7, the leftmost RBs are in a single block group, which is represented by B=1, and the other RBs represented by B=2, 3, 4 can be deduced by analogy. In the present exemplary embodiment, the RBs have a collision at the RB entry RB#0, and the RBs of B=2, 4 have the collision at the RBs RB#0 and RB#16. Regarding the RBs of B=1, the receiver may try to decode data by using the first RB RB#0 marked as "0" in collaboration with a CDM code C1 or in collaboration with other alternatives. If the first RB RB#0 can be correctly decoded, the receiver continually decodes another RB. If the first RB RB#0 cannot be correctly decoded, the receiver may combine the associated RBs for decoding together. For example, the receiver may combine the RB RB#16 marked as "16" and the RB RB#0, and decode data in collaboration with the CDM code C1 or other alternatives, as that shown by the RBs of B=2. The combination of the RBs RB#0 and RB#16 is exemplary for description, and the disclosure is not limited thereto. If the decoding is still unsuccessful, the receiver may try a combination of other block numbers and associated resource block sets for decoding until the decoding is successful. Since the block still probably collides with other blocks, and the receiver is probably unable to correctly perform the decoding, the transmitter may retransmit the other RBs, a combination of the other block groups or different CDM codes to retry the decoding. Since the combination of the block groups and the above decoding rules may influence a decoding manner of the receiver, a decoding sequence and a complexity thereof are determined according to an actual implementation. In this case, since there is none coordination mechanism between the transmitter and the receiver, the receiver blindly takes one, two, three or a plurality of block groups for decoding. In other embodiments, the receiver may decode the received data in a specific decoding rule which is coordinated between the transmitter and the receiver. Moreover, although the receiver is taken as an example in the above decoding concept, the disclosure is not limited thereto. From an aspect of the transceiver acting as a transmitter, the transmitter can also use the above concept for encoding the data to be transmitted.

Figure 8:
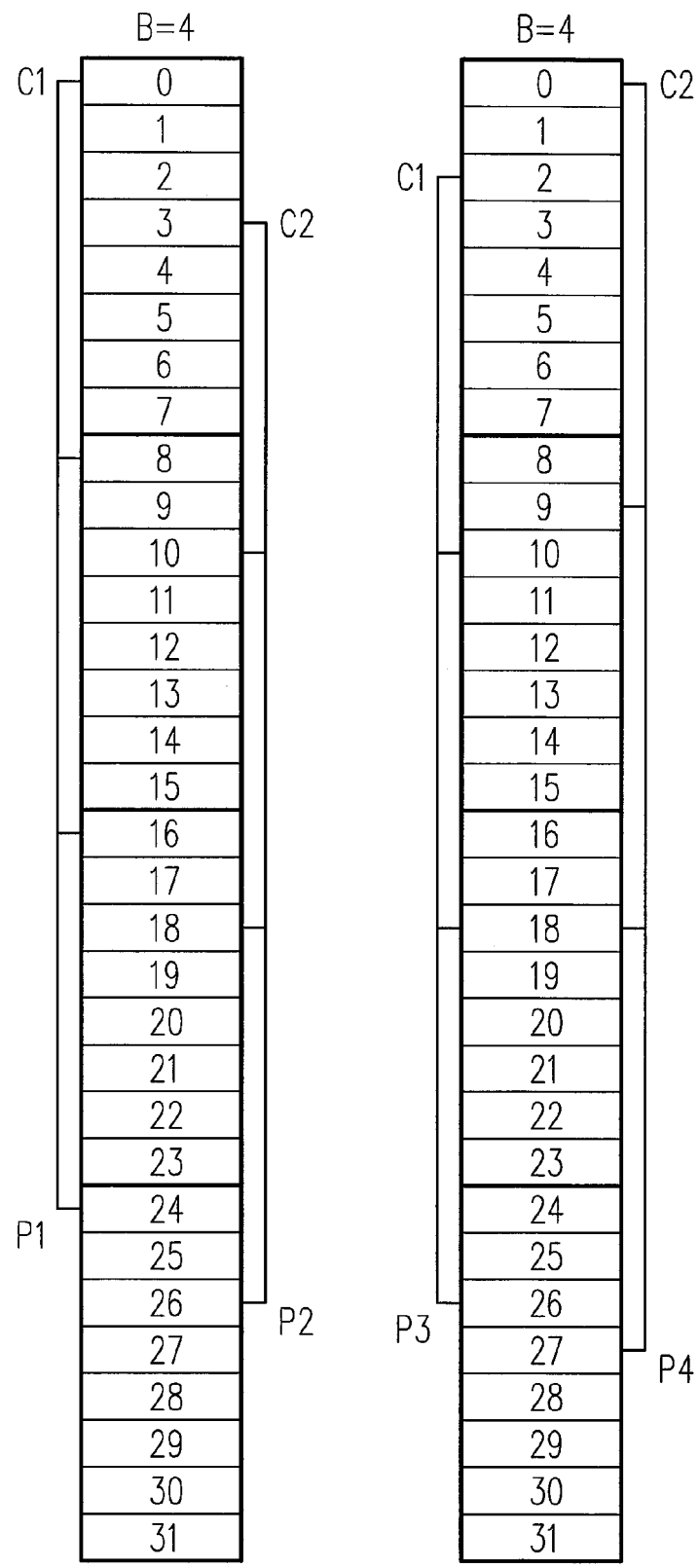
FIG. 8 is a schematic diagram illustrating a method of determining a set of resource block transmitted by four transmitters according to an exemplary embodiment of the disclosure.

FIG. 8 is a schematic diagram illustrating a method of determining a RB set transmitted by four transmitters according to an exemplary embodiment of the disclosure. Referring to FIG. 8, in the present exemplary embodiment, the transmitter transmits blocks according to the number B of the block groups, the RB entry and the CDM code. A combination of the above three parameters can determine RB sets P1-P4. In the present exemplary embodiment, a new function f3 is introduced to represent the RB set Pi, i.e. Pi=f3(Bi, Ei, Ci)={RBi1, RBi2, . . . }, where i is configured to indicate parameters of different transmitters in this embodiment, Bi is the number of the block groups, Ei is the RB entry, Ci is the CDM code, and RBi1 and RBi2 represents the selected RBs. For example, each of the block groups in FIG. 8 are divided into four sub blocks, i.e. B=4, and the RB set Pi is determined according to different combinations of the parameters Bi, Ei and Ci, for example, P1=f3(4, 0, 1)={0, 8, 16, 24}, P2=f3(4, 2, 2)={3, 10, 18, 26}, P3=f3(4, 2, 1)={2, 10, 18, 26} and P4=f3(4, 0, 2)={0, 9, 18, 27}, and selection of the block group is as that shown in FIG. 8. In this example, although the RB sets P2 and P3 collide on the block {10, 18, 26}, the used CDM codes thereof are different, which are respectively C2 and C1, the receiver can still successfully decode the data of the RB sets P2 and P3. The aforementioned RB sets P1-P4 are not used to limit the disclosure. The determination method of the present exemplary embodiment can be determined according to a predetermined list, or a function capable of generating a list of number for RB allocation, which is not limited by the disclosure.

Therefore, in the present exemplary embodiment, although the combination of a part of the RBs {10, 18, 26} has the collision, by selecting different CDM codes, the influence of the collision can be avoided. For example, in FIG. 8, by selecting the CDM codes C1 and C2, the receiver can still correctly decode data, so as to avoid the influence of the collision. A configuration of the RB sets can be broadcasted in system information, transmitted dedicatedly or pre-configured in devices.

Figure 9:
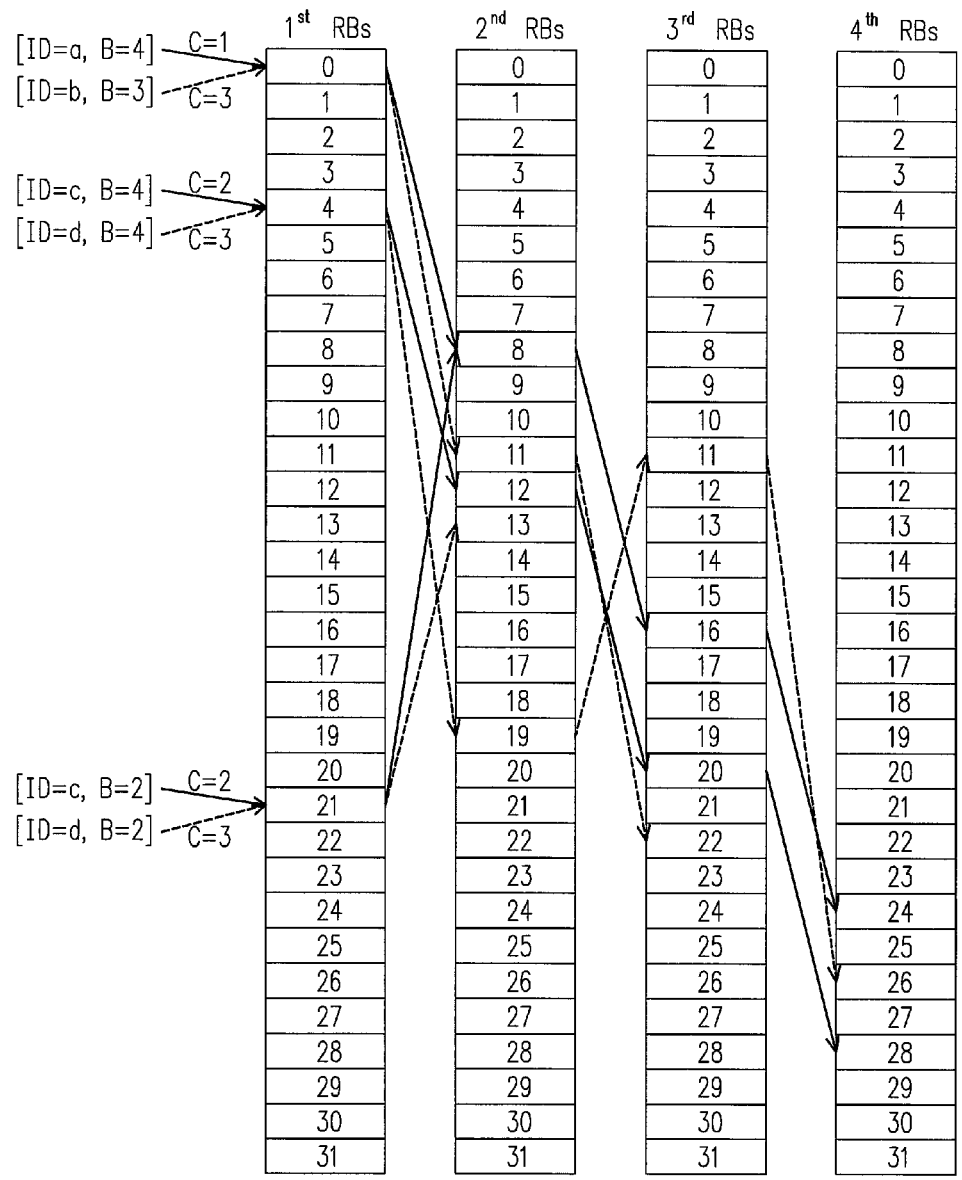
FIG. 9 is a diagram illustrating a solution of different UEs in contention according to an exemplary embodiment of the disclosure.

FIG. 9 is a diagram illustrating a solution of different UEs in contention according to an exemplary embodiment of the disclosure. Referring to FIG. 9, in the present exemplary embodiment, taking a UE [ID=a, B=4] and a UE [ID=b, B=3] as an example, the two UEs collides in the same RB entry, for example, the RB RB#0. However, when data is transmitted to the second data block, since the UE [ID=a, B=4] divides the RBs into 4 block groups, and the UE [ID=b, B=3] divides the RBs into 3 block groups, the UE [ID=a, B=4] selects the RB RB#8, and the UE [ID=b, B=3] selects the RB RB#11, so that the two UEs do not collide at the second RB. RB selecting methods of the UE [ID=a, B=4] and the UE [ID=b, B=3] in the third RB and the fourth RB are as that shown in FIG. 9. Therefore, even if the UE [ID=a, B=4] and the UE [ID=b, B=3] select the same RB in the first RB, the UEs select different RBs in the following RBs, so that collision is avoided. Therefore, the original data can be recovered by using an error correction mechanism. The above concept and operations can also be adapted to a UE [ID=c, B=4] and a UE [ID=a, B=3], and adapted to a UE [ID=c, B=2] and the UE [ID=c, B=2], and details thereof are as that shown in FIG. 9, which are not repeated.

FIG. 9 also illustrates a method of determining the RB sets according to an information length and a UE ID according to an exemplary embodiment of the disclosure. Referring to FIG. 9, in the present exemplary embodiment, a UE UE#c (i.e. a UE with an ID of c) and a UE UE#d (i.e. a UE with an ID of d) determine transmission contention according to signals, and require 4 RBs. As described in FIG. 5, the first RB is determined by the MSBs of the ID of the UE, and in this example, both of the UE UE#c and the UE UE#d require 4 RBs, i.e. both have the same parameter B=4, so that the UE UE#c and the UE UE#d are in contention at the RB RB#4 in the first RB. However, in the present exemplary embodiment, the CDM code is determined by the LSBs of the ID of the UE. Therefore, according to the function f3, the RB sets corresponding to the above UEs are separated. In the present exemplary embodiment, the RB set of the UE UE#c is {4, 12, 20, 28}, and the RB set of the UE UE#d is {4, 19, 11, 26}. Therefore, the RB entry and the CDM code of the present exemplary embodiment can randomize the RB sets of the UEs, so as to further randomize the influence of the collision.

Figure 10A:
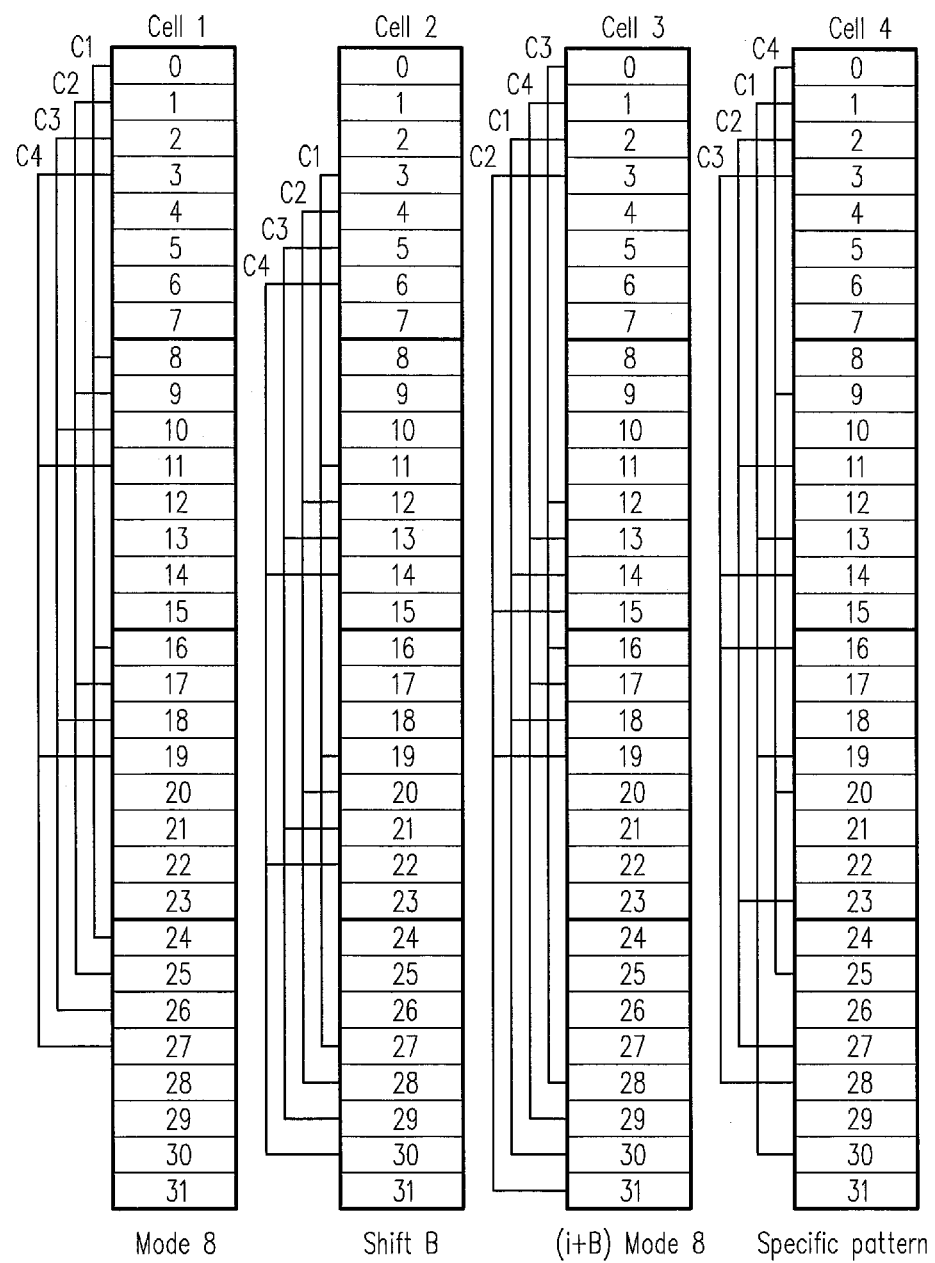
Figure 10B:
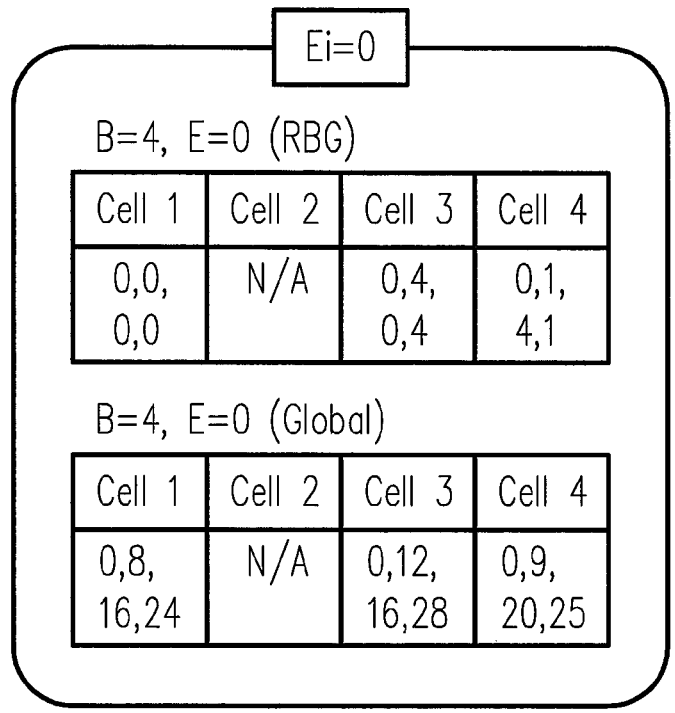
Figure 10B:
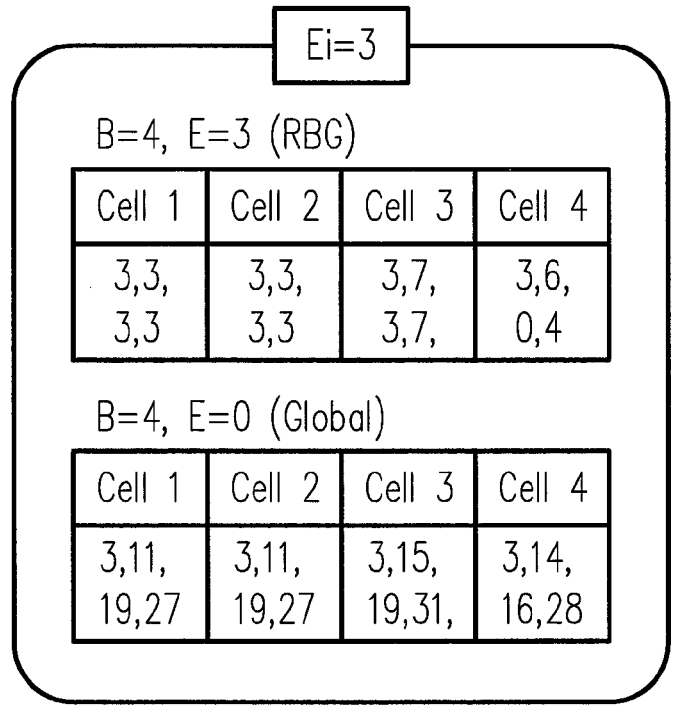

FIG. 10A, FIG. 10B and FIG. 11 are diagrams illustrating a solution of using CDM codes to avoid mutual interference of inter-cells according to an exemplary embodiment of the disclosure. In FIG. 10B, the RB sets of each of the cells of FIG. 10A are listed in a table when Ei=0 and Ei=3, and in FIG. 11, a relationship of the cell ID and the CDM code of FIG. 10 are listed in a table. Referring to FIG. 10A to FIG. 11, in the present exemplary embodiment, since the UEs belong to different cells, the interference between the cells is occurred. In the present exemplary embodiment, the cell ID can serve as the input of the function f3, which is used to determine the RB set Pi. Since B=4, each of global RBs in FIG. 10 are grouped into 4 block groups, and each of the block groups includes 8 RBs. If the RB RB#0 is selected as the RB entry (i.e. Ei=0), the RB indexes selected from the corresponding block groups in the cell 1 to the cell 4 are respectively {0,0,0,0}, {N/A}, {0,4,0,4} and {0,1,4,1}, where {N/A} represents that the cell 2 does not select RBs in the corresponding block groups when Ei=0. In view of the global RBs of each of the cells, the indexes of the global RB sets are respectively {0,8,16,24}, {N/A}, {0,12,16,28} and {0,9,20,25}. Moreover, in the example of Ei=3, the RBs selected from the corresponding block groups in the cell 1 to the cell 4 are respectively {3,3,3,3}, {3,3,3,3}, {3,7,3,7} and {3,6,0,4}. In view of the global RBs of each of the cells, the global RB sets are respectively {3,11,19,27}, {3,11,19,27}, {3,15,19,31} and {3,14,16,28}. Therefore, in the present exemplary embodiment, the method of determining the RB sets includes mode, shift, hash or a combination thereof, as that shown in FIG. 10, though the disclosure is not limited thereto. Moreover, the rightmost global RB block uses a predetermined specific pattern to determine the RB set.

In the present exemplary embodiment, in a top left table of Ei=0 of FIG. 11, Ci represents the CDM codes, CIj represents the cell identity. In the table of Ei=0, one UE uses the CDM code C1 to select the RB RB#0 in the cell 1, and none UE selects the RB RB#0 in the cell 2 to transmit data. Moreover, another UE uses the CDM code C3 to select the RB RB#0 in the cell 3, and another UE uses the CDM code C4 to select the RB RB#0 in the cell 1. Since the UEs selects different CDM codes in different cells, mutual interference of the data transmitted in the RBs is avoided. The other three tables in FIG. 11 include Ei=3, Ei=13 and Ei=27, which can be deduced according to the aforementioned concepts. Therefore, in the present exemplary embodiment, the CDM code can be used to avoid mutual interference of the inter-cells.

Figure 12:
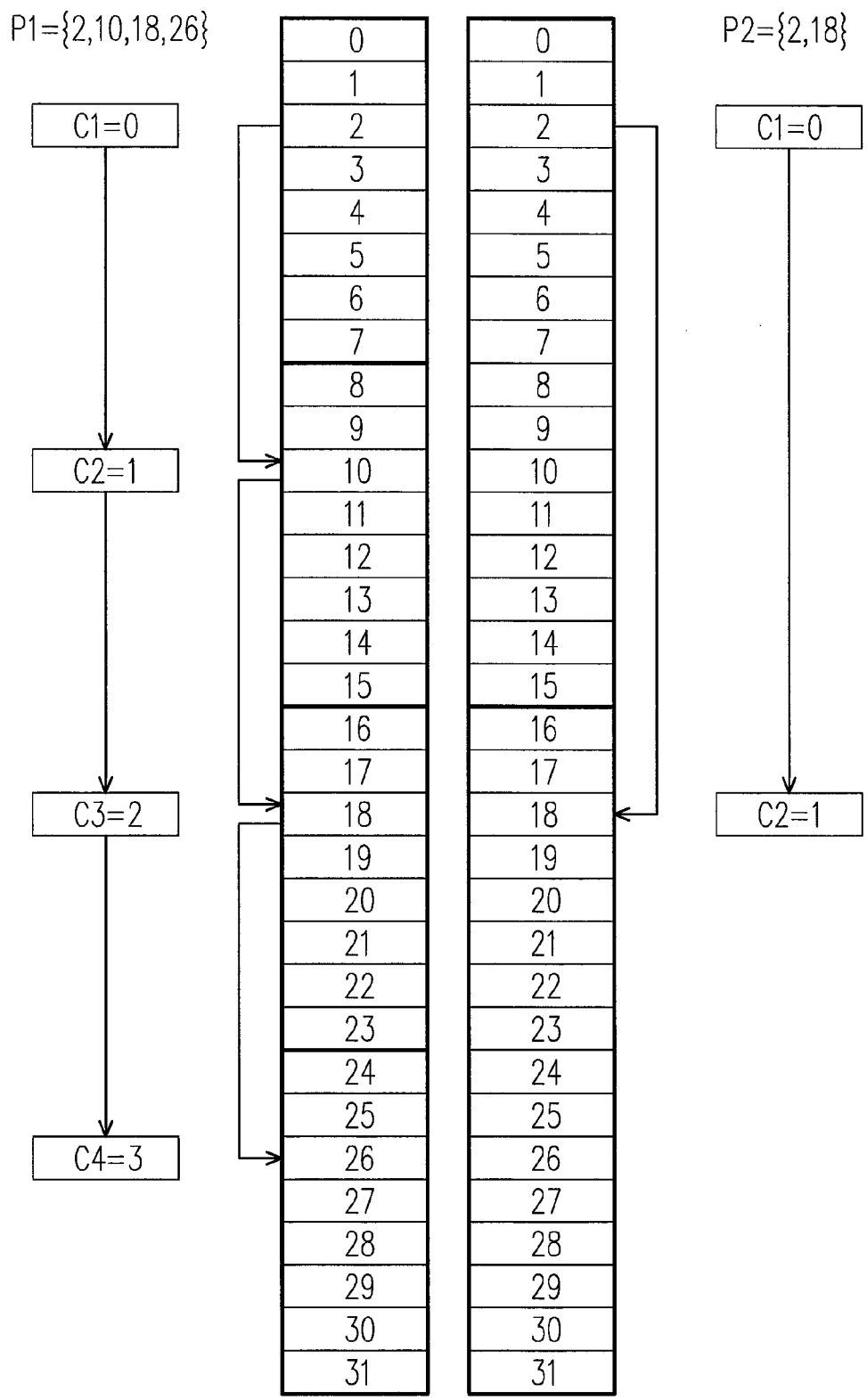
FIG. 12 illustrates a method of using the number of block groups to serve as a solution of block contention according to an exemplary embodiment of the disclosure.

FIG. 12 illustrates a method of using the number of the block groups to serve as a solution of the block contention according to an exemplary embodiment of the disclosure. Referring to FIG. 12, according to the exemplary embodiment of FIG. 10, the parameters Bi, Ei, Ci and CIj can be used to determine the RB sets. Moreover, in the exemplary embodiment of FIG. 10, the RBs are divided into 4 block groups, i.e. Bi=4. In the present exemplary embodiment, a new function f4 is introduced to determine the CDM code, where $C_{k+1}$=f4(Ck, Bi), $C_{k+1}$ and Ck are different CDM codes, and Bi is the number of the block groups. According to the concept of the present exemplary embodiment, when the data is transmitted in the block groups, there is a CDM code list, and a CDM code sequence is determined according to a function f4 with inputs of Ck and Bi. Further, if the number of the block groups is Bi=1, the receiver uses the initial CDM code C1 to decode the block. If the number of the block groups is Bi>1, the receiver uses the function f4 to determine the CDM code sequence.

In detail, in FIG. 12, the number of the block groups of the RBs to the left is 4, the RB set P1={2, 10, 18, 26}, and the CDM code sequence selected according to the function f4 is C1=0, C2=1, C3=2 and C4=3. The number of the block groups of the RBs to the right is 2, the RB set P2={2, 18}, and the CDM code sequence selected according to the function f4 is C1=0 and C2=1. The above block groups have the same RB entry, i.e. the RB RB#0, and the same block groups are derived to transmit the data, for example, the RBs RB#0 and RB#18. Therefore, the collision is probably occurred at the RBs RB#0 and RB#18. However, regarding the RB RB#18, in the present exemplary embodiment, the function f4 is used to generate different CDM code sequences, so that the UEs use different CDM codes to transmit data through the RB RB#18 at the two block groups, so as to avoid collision of the data at the RB RB#18. Regarding the RB RB#0, since the UEs use the same CDM code C1=0 to transmit data through the RB RB#0 at the two block groups, data collision is occurred at the RB RB#0. However, even so, the receiver can still try to combine information of the RBs RB#0 and RB#18 to decode the original data or decode the original data through other help. Moreover, the error correction mechanism can also be used to assist decoding in the instance of partial collision of the present exemplary embodiment. A derivative manner of the CDM code sequence can be broadcasted in system information, transmitted dedicatedly or pre-configured in devices.

Figure 13:
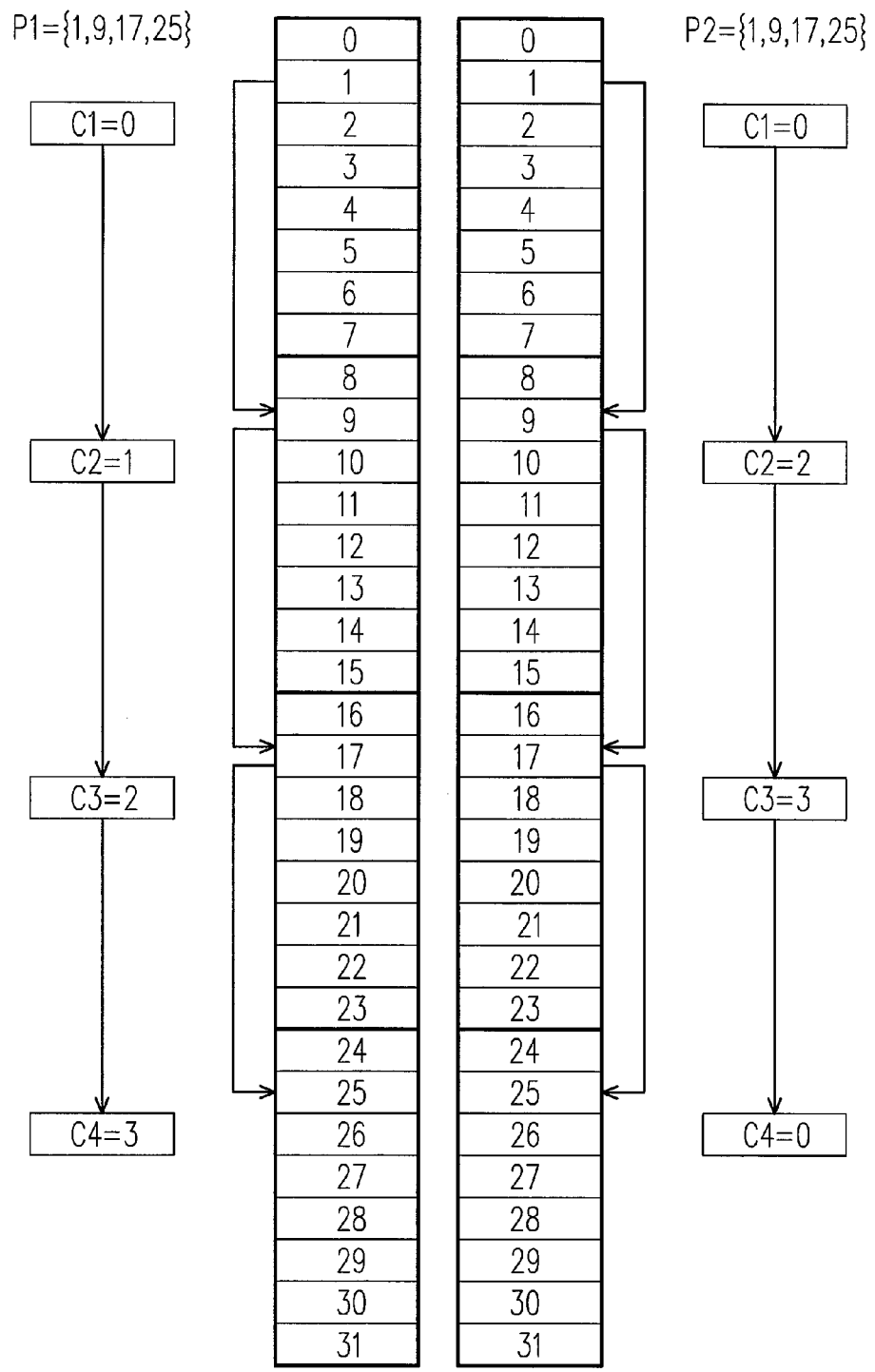
FIG. 13 illustrates a method of using the number of block groups to serve as a solution of block contention according to another exemplary embodiment of the disclosure.

FIG. 13 illustrates a method of using the number of the block groups to serve as a solution of the block contention according to another exemplary embodiment of the disclosure. Referring to FIG. 12 and FIG. 13, according to the exemplary embodiment of FIG. 12, a part of the RBs selected from the block groups of the two sides are collided, though all of the RBs selected from the block groups of the two sides are probably collided. In FIG. 13, one or more UEs selects a same parameter to generate the RB sets, and the collision is occurred, i.e. Pi=f3(Bi, Ei, Ci, CID=f3(Bi, Ei, Ci, CID=Pj. In this example, the left side RB set P1={1, 9, 17, 25}, and the right side RB set P2={1, 9, 17, 25}.

The present exemplary embodiment discloses a new function f5 to determine the CDM code sequence, where $C_{k+1}$=f5 (Ck, Bi, Rm), $C_{k+1}$ and Ck are different CDM codes, Bi is the number of the block groups, and Rm is a retransmission information such as a retry count or a retransmission number of a UE. In the present exemplary embodiment, the retry count is exemplary for the retransmission information. If the number of the block groups Bi=1, the receiver uses the initial CDM code C1 to decode the block. If the number of the block groups is Bi>1, the receiver uses the function f5 to determine the CDM code sequence. In detail, as shown in FIG. 13, when all of the RBs selected from the block groups of the two sides are collided, the UE can use the parameter Rm of the function f5 to regenerate the CDM code sequence to avoid the collision. The CDM code sequence for the corresponding RBs in this embodiment is determined according to the retransmission information of the corresponding UE. In FIG. 13, regarding the UE of the left side blocks, the parameter Rm of the function f5 thereof is, for example, a retry count R0, and in the present exemplary embodiment, the CDM code sequence retried according to the retry count R0 is set to {0, 1, 2, 3}. In order to avoid the collision, regarding the UE of the right side blocks, the parameter Rm of the function f5 thereof is, for example, a retry count R1, and in the present exemplary embodiment, the CDM code sequence retried according to the retry count R1 is set to {1, 2, 3, 0}. Therefore, by using the above retry operation method, collision of the UEs can be avoided.

However, if a plurality of the UEs selects the same RB set during transmission, even if the retry operation is performed, the collision is still probably occurred. Therefore, in the present exemplary embodiment, besides that the CDM code sequence of the retry counts R0 and R1 are set, a CDM code sequence {2, 3, 0, 1} of a retry count R2 and a CDM code sequence {3, 0, 1, 2} of a retry count R3 are further provided, so as to reduce a chance of collision after the retry operation. In the present exemplary embodiment, the CDM code sequences corresponding to different retry counts Rm are only used as an example, which are not limited by the disclosure.

Figure 14:
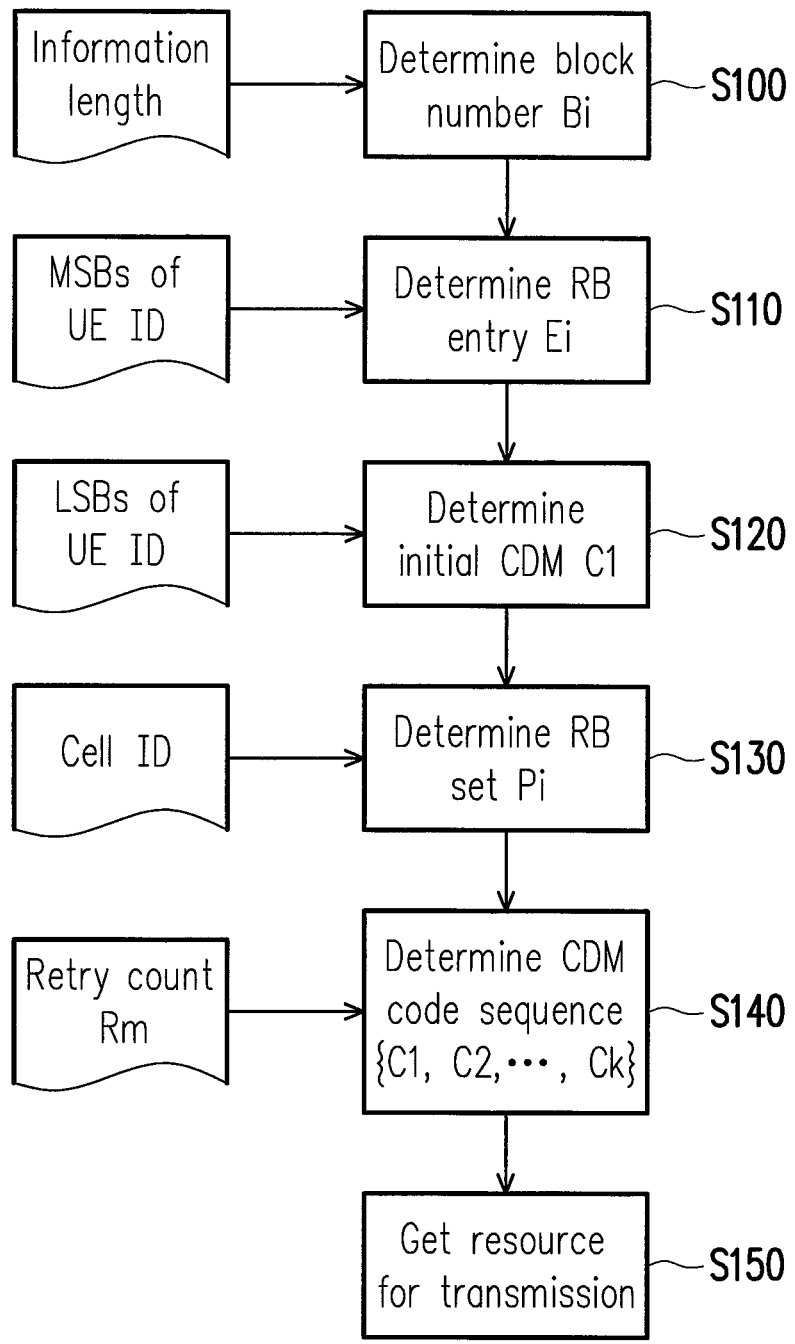
FIG. 14 is a flowchart illustrating a multi-block transmission method according to an exemplary embodiment of the disclosure.

In conclusion, FIG. 14 is a flowchart illustrating a multi-block transmission method according to an exemplary embodiment of the disclosure. Referring to FIG. 14, first, in step S100, the number Bi of the required RBs can be determined according to the information length. Then, in step S110, the entry Ei of the RB can be determined according to the MSBs of the ID of the UE. Then, in step S120, the initial CDM code C1 can be determined according to the LSBs of the ID of the UE. Namely, the CDM code sequence includes one element, i.e. the initial CDM code C1. The exemplary embodiment of FIG. 6-FIG. 8 can be referred for the concepts of the steps S100-S120. Therefore, in the disclosure, the RB sets can be determined according to the information length and the ID of the UE.

Then, in step S130, the RB set Pi is determined according to the cell ID. In such step, the RB set is determined according to the Cell ID, so as to mitigate interference of the inter-cells. The exemplary embodiment of FIG. 10 can be referred for the above concept. Then, in step S140, the retry count Rm is used to determine the CDM code sequence, and the exemplary embodiments of FIG. 12 and FIG. 13 can be referred for such concept. Then, in step S150, the transmission resource is gotten to transmit data, which includes coding/decoding the data to be transmitted.

Figure 15:
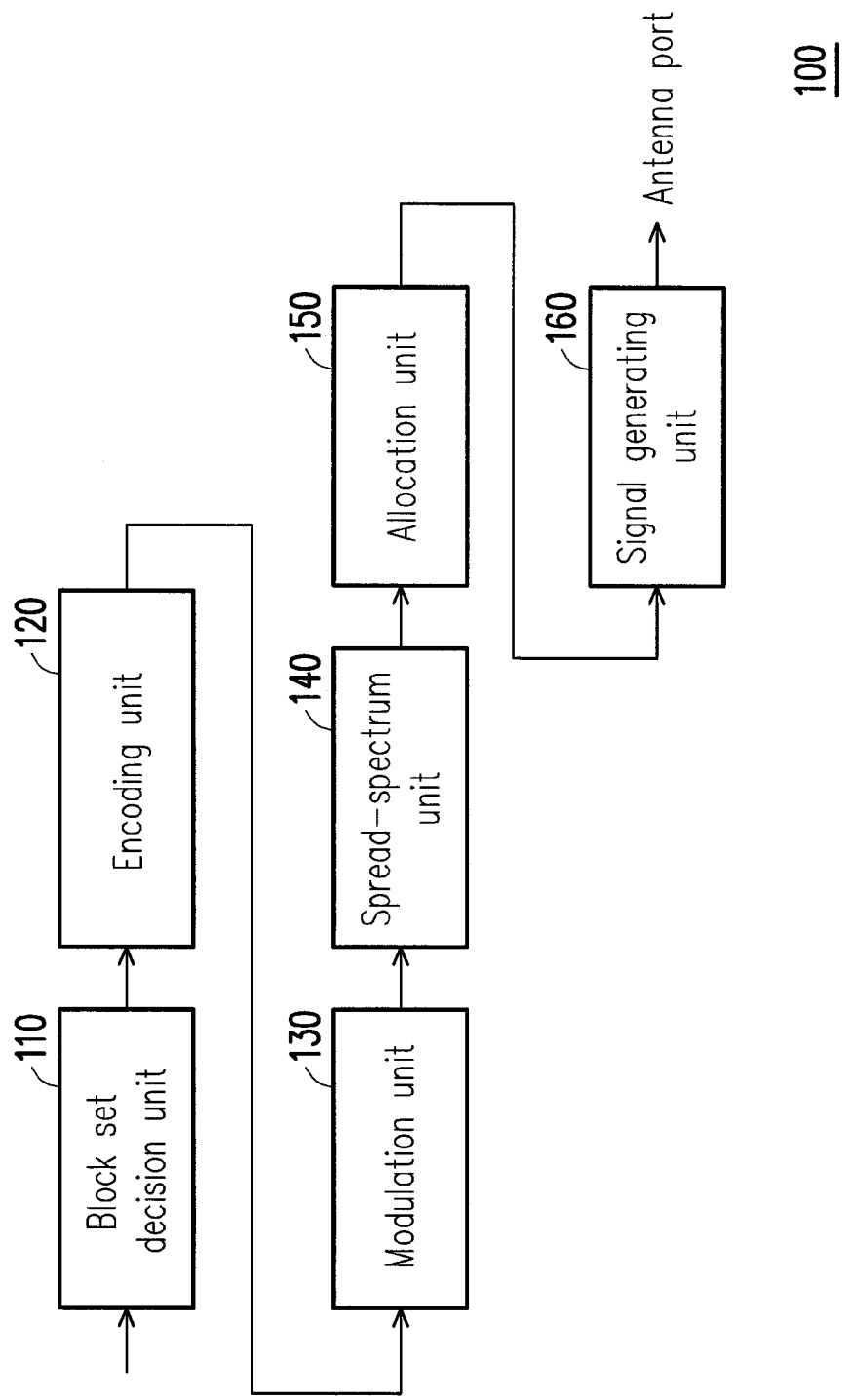
FIG. 15 is a schematic diagram of implementing the multi-block transmission method of FIG. 14 in a physical layer.

FIG. 15 is a schematic diagram of implementing the multi-block transmission method of FIG. 14 in a physical layer. Referring to FIG. 14 and FIG. 15, the transmission method of the present exemplary embodiment is, for example, adapted to a transmitter module 100. In the present exemplary embodiment, the transmitter module 100 includes a block set decision unit 110, a coding unit 120, a modulation unit 130, a spread-spectrum unit 140, and an allocation unit 150. As shown in FIG. 14, when a base station grants a contention-based signal transmission resource, the transmitter determines a size of the required RBs according to the information length, and then determines the RB sets and the CDM code sequences according to the ID of the UE, the cell ID and the retry count. The above operations are, for example, executed by the block set decision unit 110. Then, the encoding unit 120 performs channel coding on the output of the block set decision unit 110. After the channel coding is completed, the encoding unit 120 performs a rate matching operation on the coded signal. A bit size of the coded signal is limited by the rate matching. Then, the modulation unit 130 modulates an output signal of the encoding unit 120 by using a fixed modulation sequence, so as to provide fair signal contention. The modulation method is, for example, QPSK. Actually, the modulated signal is spread by the spread-spectrum unit 140 by using a predetermined orthogonal cover code sequence. Then, the allocation unit 150 allocates according to the RB sets. Then, a signal generating unit 160 generates a signal by using the OFDM based signal generation rule according to the signal output from the allocation unit 150.

Figure 16:
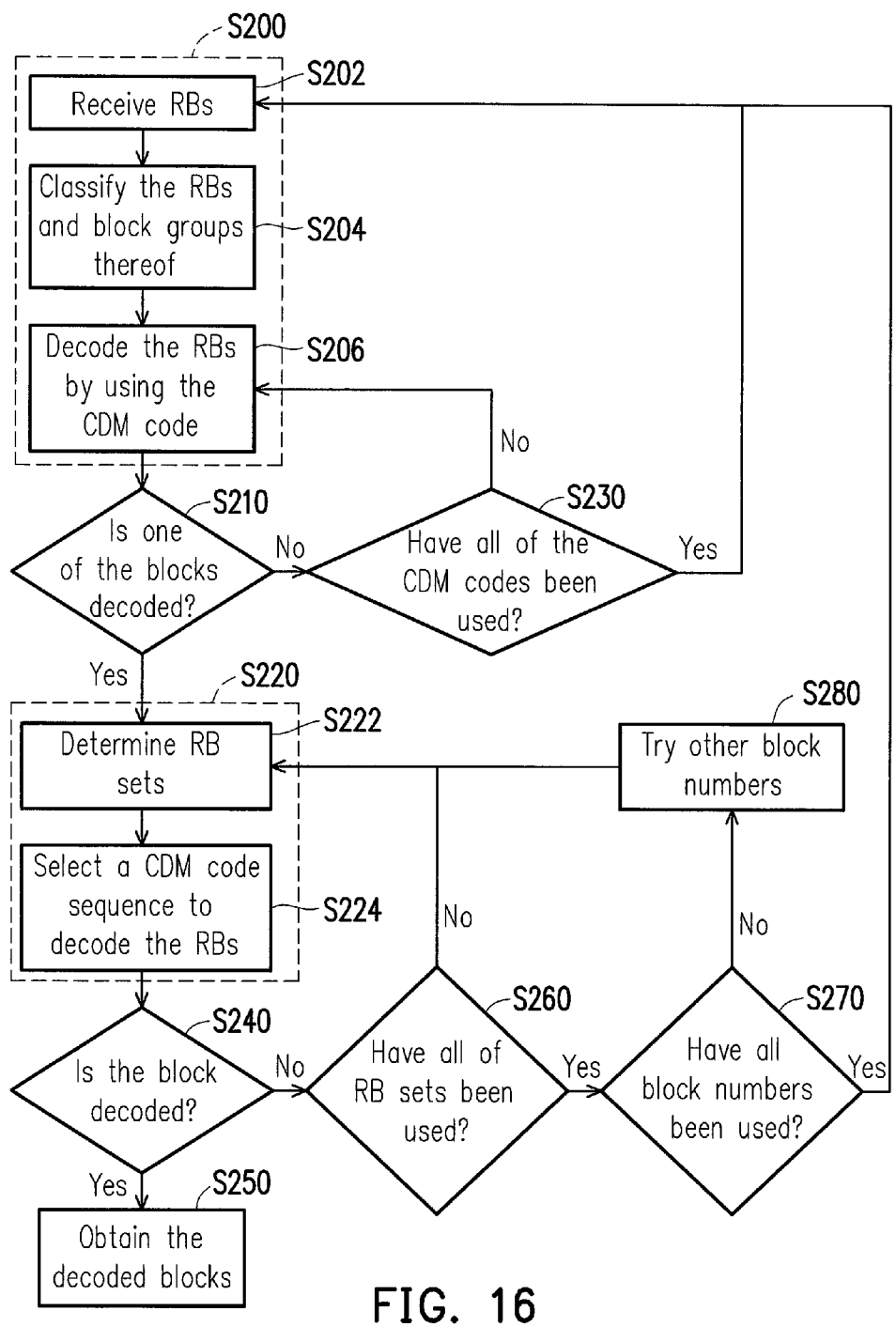
FIG. 16 is a flowchart illustrating a multi-block receiving method according to an exemplary embodiment of the disclosure.

FIG. 16 is a flowchart illustrating a multi-block receiving method according to an exemplary embodiment of the disclosure. Referring to FIG. 16, in the present exemplary embodiment, a base station is taken as an example for descriptions, though the disclosure is not limited thereto. When the base station receives the RBs (step S202), the base station classifies the RBs and the block groups thereof according to a specific algorithm (step S204), and deduces the CDM code of the RBs according to the concept disclosed by the disclosure. After the CDM code sequence of the RBs is also deduced, the base station tries to decode the RBs according to the obtained CDM code. The above operation flow is a step S200. In step S210, if it is determined that one of the RBs received in the step S202 can be decoded, in step S220, the base station determines an RB set (step S222), and selects a CDM code sequence to decode the RB (step S224). In the step S210, if it is determined that the blocks in the step S200 cannot be decoded, in step S230, the base station inspects whether all of the CDM codes have been used. If yes, the method flow is returned to the sub step S202 of the step S210, and the RBs are re-received. If not, the method flow is returned to the sub step S206 of the step S210, and other unused CDM codes are used to decode the RB.

Then, in step S240, if it is determined that decoding of the RB is completed in the step S220, in step S250, the base station obtains the decoded block. In the step S240, if it is determined that decoding of the RB is not completed in the step S220, in step S260, the base station inspects whether all of the RB sets have been used. If not, the method flow is returned to the sub step S222 of the step S220, and the base station again determines the RB sets. If yes, in step S270, the base station inspects whether all of the block group numbers have been tried. If not, in step S280, the base station tries the other block group numbers, and the method flow is returned to the step S222 to determine the RB sets. If yes, the method flow is returned to the sub step S202 of the step S210, and the RBs are re-received.

Figure 17:
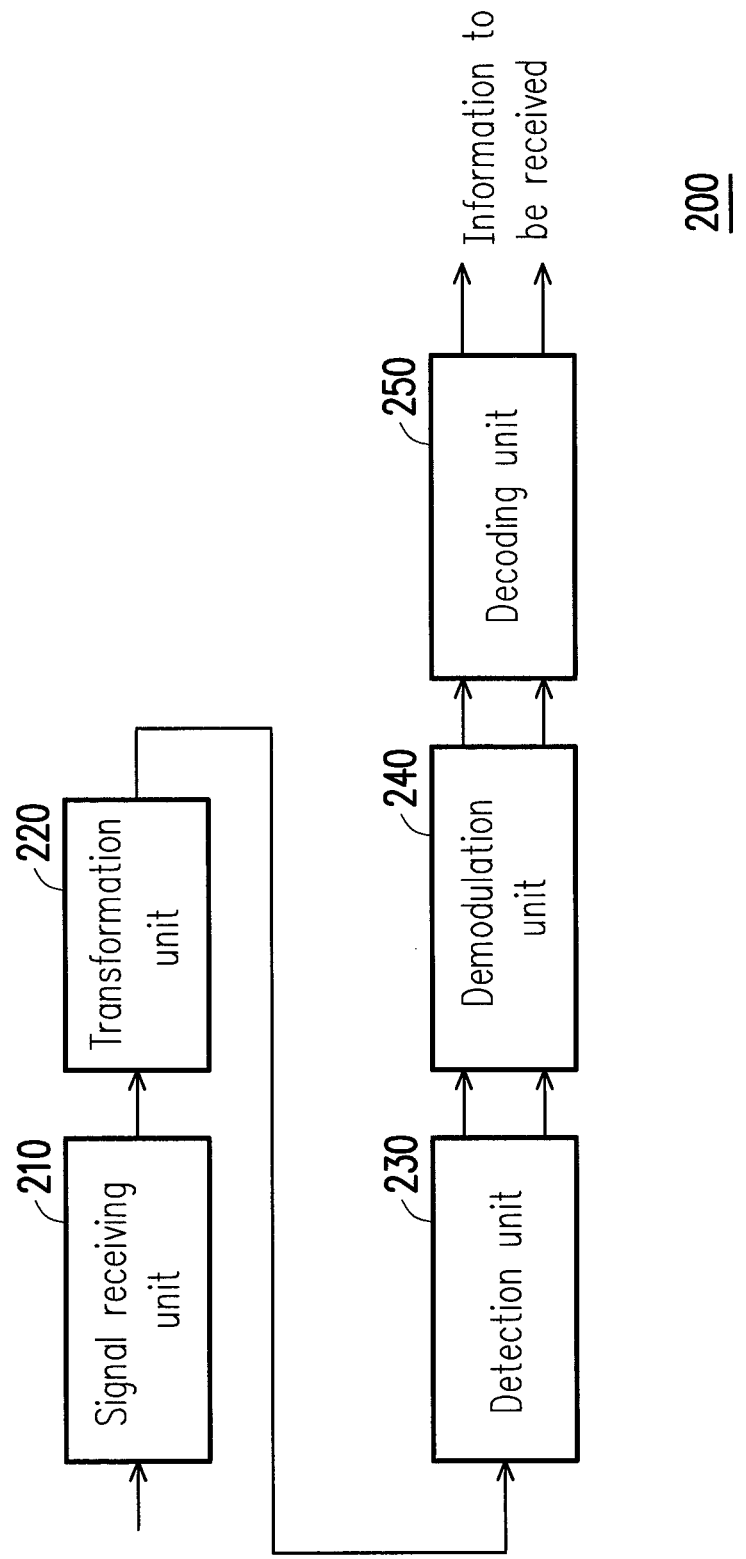
FIG. 17 is a schematic diagram of a detection flow of multi-block information according to an exemplary embodiment of the disclosure.

FIG. 17 is a schematic diagram of a detection flow of multi-block information according to an exemplary embodiment of the disclosure. Referring to FIG. 17, the detection method of the present exemplary embodiment is, for example, adapted to a receiver module 200. In the present exemplary embodiment, the receiver module 200 includes a signal receiving module 210, a transformation module 220, a detection module 230, a demodulation module 240 and a decoding module 250. The signal receiving module 210 receives a baseband signal. Then, the transformation module 220 performs a fast fourier transform (FFT) on the received baseband signal, and the detection module 230 blindly detects uplink information in a frequency domain according to all of possible block groups and CDM code sequences. Then, the demodulation module 240 obtains a soft value by using a demodulation function. Therefore, once the decoding module 250 can correctly decode signals through de-rate matching and a channel decoder, the receiver module can recognize detailed information transmitted by the transmitter module.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-block radio access method, comprising:
grouping a plurality of resource blocks into a plurality of block groups;
respectively selecting one resource block from each of the plurality of block groups to form a plurality of resource block sets, wherein data to be accessed are transmitted in corresponding one of the resource block sets;
determining a code division multiplexing code sequence for the corresponding one of the resource block sets according to at least one of a plurality of parameters;
performing encoding or decoding operations on the data to be accessed according to the corresponding one of the resource block sets and the corresponding code division multiplexing code sequence; and
accessing the encoded or decoded data.

2. The multi-block radio access method as claimed in claim 1, wherein in the step of grouping the resource blocks into the block groups, the numbers of the grouped block groups of the resource blocks is determined according to a parameter related to the data to be accessed.

3. The multi-block radio access method as claimed in claim 1, wherein in the step of respectively selecting the resource block to form the plurality of resource block sets, at least one resource block in each of the plurality of resource block sets of different transceiver equipments has a collision.

4. The multi-block radio access method as claimed in claim 1, wherein the step of determining the code division multiplexing code sequence for the corresponding one of the resource block sets comprises:
determining the code division multiplexing code sequence for the corresponding one of the resource block sets according to a parameter related to an information of a corresponding transceiver equipment.

5. The multi-block radio access method as claimed in claim 1, wherein the step of determining the code division multiplexing code sequence for the corresponding one of the resource block sets comprises:
determining the code division multiplexing code sequence for the corresponding one of the resource block sets according to the number of the grouped block groups.

6. The multi-block radio access method as claimed in claim 1, wherein the step of determining the code division multiplexing code sequence for the corresponding one of the resource block sets comprises:
determining the code division multiplexing code sequence for the corresponding one of the resource block sets according to a retransmission information of a corresponding transceiver equipment.

7. The multi-block radio access method as claimed in claim 1, wherein the step of respectively selecting the resource block to form the plurality of resource block sets comprises:
determining a resource block entry for each of the plurality of resource block sets according to a parameter related to an information of a corresponding transceiver equipment.

8. The multi-block radio access method as claimed in claim 1, wherein the step of respectively selecting the resource block to form the plurality of resource block sets comprises:
determining each of the resource blocks in the plurality of resource block sets according to an information of a cell where each transceiver equipment belongs to, wherein each of the resource blocks in the plurality of resource block sets is selected from different block groups in the plurality of block groups.

9. A transmitter module, adapted to execute a multi-block radio access method, and comprising:
a block set decision unit, grouping a plurality of resource blocks into a plurality of block groups, and respectively determining one resource block from each of the plurality of block groups to form a plurality of resource block sets, wherein data to be accessed are transmitted in corresponding one of the resource block sets; and
an encoding unit, determining a code division multiplexing code sequence for the corresponding one of the resource block sets according to at least one of a plurality of parameters, and performing an encoding operation on the data to be transmitted according to the corresponding one of the resource block sets and the corresponding code division multiplexing code sequence.

10. The transmitter module as claimed in claim 9, wherein according to a grouping method of the block set decision unit, the numbers of the grouped block groups of the resource blocks is determined according to a parameter related to the data to be accessed.

11. The transmitter module as claimed in claim 9, wherein according to a determination method of the block set decision unit, at least one resource block in each of the plurality of resource block sets of different transceiver equipments has a collision.

12. The transmitter module as claimed in claim 9, wherein according to a determination method of the block set decision unit, the block set decision unit respectively selects one resource block from each of the plurality of block groups to form the plurality of resource block sets corresponding to different transceiver equipments.

13. The transmitter module as claimed in claim 9, wherein according to a determination method of the block set decision unit, the block set decision unit respectively assigns one resource block from each of the plurality of block groups to form the plurality of resource block sets corresponding to different transceiver equipments.

14. The transmitter module as claimed in claim 9, wherein the encoding unit specifically or blindly determines the corresponding one of the resource block sets for performing the encoding operation.

15. The transmitter module as claimed in claim 9, wherein the encoding unit determines the code division multiplexing code sequence for the corresponding one of the resource block sets according to a parameter related to an information of a corresponding transceiver equipment.

16. The transmitter module as claimed in claim 9, wherein the encoding unit determines the code division multiplexing code sequence for the corresponding one of the resource block sets according to the number of the grouped block groups.

17. The transmitter module as claimed in claim 9, wherein the encoding unit determines the code division multiplexing code sequence for the corresponding one of the resource block sets according to a retransmission information of a corresponding transceiver equipment.

18. The transmitter module as claimed in claim 9, wherein the block set decision unit determines a resource block entry for each of the plurality of resource block sets according to a parameter related to an information of a corresponding transceiver equipment.

19. The transmitter module as claimed in claim 9, wherein the block set decision unit determines each of the resource blocks in the plurality of resource block sets according to an information of a cell where each transceiver equipment belongs to, wherein each of the resource blocks in the resource block sets is selected from different block groups in the plurality of block groups.

20. The transmitter module as claimed in claim 9, further comprising:
a modulation unit, modulating the encoded data.

21. A receiver module, adapted to execute a multi-block radio access method, and comprising:
a detection unit, detecting a resource block set of received data, wherein the received data are transmitted in one of a plurality of resource block sets; and
a decoding unit, determining a code division multiplexing code sequence used for decoding the resource block set of the received data according to at least one of a plurality of parameters, and decoding the received data according to the resource block set and the code division multiplexing code sequence.

22. The receiver module as claimed in claim 21, wherein the received data is transmitted by a plurality of resource blocks which are grouped into a plurality of block groups, and the resource blocks are selected respectively from each of the plurality of block groups to form the resource block set.

23. The receiver module as claimed in claim 22, wherein the detection unit detects the numbers of the grouped block groups of the resource blocks according to a parameter related to the received data.

24. The receiver module as claimed in claim 21, wherein according to the detection result of the detection unit, at least one resource block in the resource block set respectively corresponding to different transceiver equipments has a collision.

25. The receiver module as claimed in claim 21, wherein the decoding unit determines the code division multiplexing code sequence for the resource block set according to a parameter related to an info nation of a corresponding transceiver equipment.

26. The receiver module as claimed in claim 22, wherein the decoding unit determines the code division multiplexing code sequence for the resource block set according to the number of the grouped block groups.

27. The receiver module as claimed in claim 21, wherein the decoding unit determines the code division multiplexing code sequence for the resource block set according to a retransmission information of a corresponding transceiver equipment.

28. The receiver module as claimed in claim 21, wherein the detection unit detects a resource block entry in the resource block set according to a parameter related to an information of a corresponding transceiver equipment.

29. The receiver module as claimed in claim 21, wherein the detection unit detects each of the resource blocks in the resource block set according to an information of a cell where each transceiver equipment belongs, wherein each of the resource blocks in the resource block set is selected from different block groups in the plurality of block groups of the received data.

30. The receiver module as claimed in claim 21, further comprising:
a demodulation unit, demodulating the decoded data.

31. A multi-block radio access method, comprising:
grouping a plurality of resource blocks into a plurality of block groups according to a parameter related to data to be accessed;
respectively selecting one resource block from each of the plurality of block groups to form a plurality of resource block sets, wherein data to be accessed are transmitted in corresponding one of the resource block sets;
performing encoding or decoding operations on the data to be accessed according to the corresponding one of the resource block sets; and
accessing the encoded or decoded data.

32. The multi-block radio access method as claimed in claim 31, wherein in the step of respectively selecting the resource block to form the plurality of resource block sets, at least one resource block in each of the plurality of resource block sets of different transceiver equipments has a collision.

33. The multi-block radio access method as claimed in claim 31, further comprising:
determining a code division multiplexing code sequence for the corresponding one of the resource block sets according to at least one of a plurality of parameters,
wherein in the step of performing encoding or decoding operations on the data to be accessed, performing encoding or decoding operations on the data to be accessed further according to the code division multiplexing code sequence.

34. The multi-block radio access method as claimed in claim 33, wherein the step of determining the code sequence for the corresponding one of the resource block sets comprises:
determining the code sequence for the corresponding one of the resource block sets according to the parameter related to an information of a corresponding transceiver equipment.

35. The multi-block radio access method as claimed in claim 33, wherein the step of determining the code sequence for the corresponding one of the resource block sets comprises:
determining the code sequence for the corresponding one of the resource block sets according to the number of the grouped block groups.

36. The multi-block radio access method as claimed in claim 33, wherein the step of determining the code sequence for the corresponding one of the resource block sets comprises:
determining the code sequence for the corresponding one of the resource block sets according to a retransmission information of a corresponding transceiver equipment.

37. The multi-block radio access method as claimed in claim 31, wherein the step of respectively selecting the resource block to form the plurality of resource block sets comprises:

determining a resource block entry for each of the plurality of resource block sets according to the parameter related to an information of a corresponding transceiver equipment.

38. The multi-block radio access method as claimed in claim 31, wherein the step of respectively selecting the resource block to form the plurality of resource block sets comprises:
determining each of the resource blocks in the plurality of resource block sets according to an information of a cell where each transceiver equipment belongs to, wherein each of the resource blocks in the plurality of resource block sets is selected from different block groups in the plurality of block groups.

* * * * *